United States Patent
Yamada et al.

(10) Patent No.: US 9,746,206 B2
(45) Date of Patent: Aug. 29, 2017

(54) HEAT-ABSORBING MATERIAL AND PROCESS FOR PRODUCING SAME

(71) Applicants: DEXERIALS CORPORATION, Tokyo (JP); TOHOKU UNIVERSITY, Sendai-shi, Miyagi (JP)

(72) Inventors: Takatoshi Yamada, Miyagi (JP); Akio Takada, Miyagi (JP); Hiroo Yugami, Miyagi (JP); Fumitada Iguchi, Miyagi (JP); Makoto Shimizu, Miyagi (JP)

(73) Assignee: DEXERIALS CORPORATION, Tokyo (JP)

(*) Notice: Subject to any disclaimer, the term of this patent is extended or adjusted under 35 U.S.C. 154(b) by 37 days.

(21) Appl. No.: 14/397,923

(22) PCT Filed: May 1, 2013

(86) PCT No.: PCT/JP2013/062713
§ 371 (c)(1),
(2) Date: Oct. 30, 2014

(87) PCT Pub. No.: WO2013/165014
PCT Pub. Date: Nov. 7, 2013

(65) Prior Publication Data
US 2015/0132596 A1 May 14, 2015

(30) Foreign Application Priority Data

May 1, 2012 (JP) .................................. 2012-104868
May 1, 2013 (JP) .................................. 2013-096258

(51) Int. Cl.
*B32B 15/01* (2006.01)
*F24J 2/48* (2006.01)
(Continued)

(52) U.S. Cl.
CPC .................. *F24J 2/481* (2013.01); *C09K 5/14* (2013.01); *C23F 1/00* (2013.01); *C25F 3/06* (2013.01);
(Continued)

(58) Field of Classification Search
USPC ........................................................ 428/596
See application file for complete search history.

(56) References Cited

U.S. PATENT DOCUMENTS 4,316,049 A * 2/1982 Hanak ............. H01L 31/022466
136/244
4,834,066 A 5/1989 Collins et al.
(Continued)

FOREIGN PATENT DOCUMENTS

EP 2 341 038 A1 7/2011
JP A-63-501977 8/1988
(Continued)

OTHER PUBLICATIONS

English machine translation of JP 2003-332607, EPO, accessed Aug. 15, 2016.*
(Continued)

*Primary Examiner* — Humera Sheikh
*Assistant Examiner* — Lucas Wang
(74) *Attorney, Agent, or Firm* — Oliff PLC

(57) ABSTRACT

Provided are a heat-absorbing material having high heat resistance and high wavelength selectivity, and a process for producing the same. The heat-absorbing material includes: a heat-resistant metal having the substantially same periodic structure in the light incidence plane as the wavelength of sunlight having a specific wavelength in the wavelength regions of visible light and near-infrared rays; and a cermet formed on the light incidence plane of the heat-resistant metal. Thus, there can be achieved desirable absorption and (Continued)

radiation characteristics being such that absorption is performed in the visible light region meanwhile reflection is performed in the infrared region. Furthermore, the cermet does not need complicated film-formation control, and therefore, the high heat resistance can be maintained.

13 Claims, 33 Drawing Sheets

(51) Int. Cl.
    *C09K 5/14*     (2006.01)
    *C23F 1/00*     (2006.01)
    *C25F 3/06*     (2006.01)
    *H01B 13/00*     (2006.01)
    *C25F 3/14*     (2006.01)

(52) U.S. Cl.
    CPC ................. *C25F 3/14* (2013.01); *F24J 2/484* (2013.01); *F24J 2/485* (2013.01); *F24J 2/487* (2013.01); *H01B 13/0026* (2013.01); *Y02E 10/40* (2013.01); *Y10T 428/1266* (2015.01); *Y10T 428/12361* (2015.01); *Y10T 428/12611* (2015.01); *Y10T 428/12667* (2015.01); *Y10T 428/24612* (2015.01); *Y10T 428/26* (2015.01)

(56) References Cited

U.S. PATENT DOCUMENTS

| | | | |
|---|---|---|---|
| 8,318,329 B2 | 11/2012 | Silmy et al. | |
| 2005/0274374 A1* | 12/2005 | Boguslavskiy | C21D 7/06 126/92 AC |
| 2009/0025529 A1 | 1/2009 | Perrotta | |
| 2009/0208761 A1* | 8/2009 | Silmy | F24J 2/07 428/448 |
| 2009/0266355 A1 | 10/2009 | Liu et al. | |
| 2011/0249326 A1* | 10/2011 | Villuendas Yuste | F24J 2/485 359/360 |

FOREIGN PATENT DOCUMENTS

| | | |
|---|---|---|
| JP | A-2003-332607 | 11/2003 |
| JP | A-2008-503066 | 1/2008 |
| JP | A-2008-121999 | 5/2008 |
| JP | A-2008-209011 | 9/2008 |
| JP | A-2009-198170 | 9/2009 |
| JP | A-2010-181045 | 8/2010 |
| JP | A-2011-2128 | 1/2011 |
| JP | A-2009-257753 | 11/2011 |
| JP | A-2012-506021 | 3/2012 |

OTHER PUBLICATIONS

Bogaerts et al., "Review Materials for Photothermal Solar Energy Conversion," *Journal of Materials Science*, vol. 18, (1983), pp. 2847-2875.
Zhang, "Recent Progress in High-Temperature Solar Selective Coatings," *Solar Energy Materials & Solar Cells*, vol. 62, (2000), pp. 63-74.
De Boor et al., "Three-beam Interface Lithography: Upgrading a Lloyd's Interferometer for Single-Exposure Hexagonal Patterning," *Optics Letters*, vol. 34, No. 12, Jun. 15, 2009, pp. 1783-1785.
Chester et al., "Design and Global Optimization of High-Efficiency Solar Thermal Systems with Tungsten Cermets," *Optics Express*, vol. 19, No. S3, Mar. 29, 2011, pp. A245-A257.
Wang et al, "Optical Property and Thermal Stability of Mo/Mo-SiO$_2$/ SiO$_2$ Solar-Selective Coating Prepared by Magnetron Sputtering," *Physica Status Solidi A*, (2010), vol. 208, No. 3, pp. 664-667.
International Search Report issued in International Patent Application No. PCT/JP2013/062713 dated Aug. 6, 2013.

* cited by examiner

HEAT-ABSORBING MATERIAL AND PROCESS FOR PRODUCING SAME

FIELD OF THE INVENTION

The present invention relates to a heat-absorbing material for concentrated solar power (CSP) and a process for producing the same. The present application asserts priority rights based on JP Patent Application 2012-104868 filed in Japan on May 1, 2012 and JP Patent Application 2013-96258 filed in Japan on May 1, 2013. The total contents of disclosure of the Patent Application of the senior filing date are to be incorporated by reference into the present Application.

BACKGROUND OF THE INVENTION

Concentrated solar power (CSP) is power generation performed in such a manner that sunlight is reflected by a mirror and concentrated in a receiver, then electric power is generated by the heat of the sunlight. CSP is roughly classified into a trough type and a tower type. The trough type is performed by concentrating sunlight onto a linear receiver by a cylindrical paraboloidal type mirror, meanwhile the tower type is performed by concentrating sunlight onto a receiver having a dot shape (several meters square) arranged on a tower, by a mirror, called heliostat, dispersed on the ground. At present, the biggest problem with these types of CSP is that both of the types have a low conversion efficiency, namely, only approximately 15%.

The biggest factor in determining the conversion efficiency is a receiver as a heat-absorbing material. The desired characteristics for receivers are such that a receiver efficiently absorbs the concentrated sunlight and the receiver itself hardly lets heat escape.

In CSP, the temperature of a receiver reaches a high temperature, namely, 400 degrees C. or more, and accordingly heat radiation loss due to this cannot be ignored. The intensity and wavelength distribution of heat radiation is expressed by a function of the temperature of an object according to Planck's law.

FIG. 37 illustrates graphs showing spectra of solar radiation and heat radiation. The figure shows heat radiation at a temperature of 200 degrees C., 400 degrees C., and 800 degrees C., and at the higher temperature, the distribution thereof moves to the shorter wavelength side. The wavelength region of heat radiation at approximately 6000 degrees C. naturally coincides with the wavelength region of solar radiation.

As shown in FIG. 37, when the spectra of solar radiation and heat radiation are compared, it is understood that solar radiation is stronger in the visible region, meanwhile heat radiation is stronger in the infrared region. Hence, as a receiver, there is useful a wavelength-selective material having higher absorption in the visible region and lower radiation in the infrared region, in other words, a wavelength-selective material having higher absorption in the visible region and lower absorption in the infrared region.

Receivers having wavelength selectivity have been already developed and some of the receivers have been commercialized. For example, Non-patent Literature 1 takes a general view of receivers having wavelength selectivity, and describes the classification of the principle thereof and a temperature range in which, receivers, including a material having no wavelength selectivity, can be used. Furthermore, Non-patent Literature 2 describes that a cermet (mixture of a metal and a ceramic) of molybdenum and alumina is film-formed on a metal to be a double layer, whereby, while aiming at achieving high heat resistance, the wavelength region for absorption is controlled. Furthermore, ALANOD, ACKTAR Ltd. and the like have actually commercialized absorbing materials having wavelength selectivity.

PRIOR-ART DOCUMENTS

Non-Patent Document

Non-patent Literature 1: W. F. Borgaerts, C. M. Lampert, "Review: Materials for photothermal solar energy conversion" J. Mater. Sci. 18, pp. 2847-2875 (1983)

Non-patent Literature 2: Q.-C. Zhang, "Recent progress in high-temperature solar selective coatings", SoL. Energy Mater. Sol. Cells 62, pp. 63-74 (2000)

SUMMARY OF THE INVENTION

However, the arts disclosed in Non-patent Literatures 1 and 2 cannot achieve sufficiently low absorption in the infrared region and accordingly cannot obtain high wavelength selectivity. Furthermore, products manufactured by ALANOD, ACKTAR Ltd. and the like have high wavelength selectivity in a low temperature region, but, has a low heat-resistance temperature, approximately not more than 350 degrees C., and thus, cannot withstand use for CSP in which the temperature of a receiver reaches a high temperature, namely, not less than 400 degrees C.

The present invention is proposed in view of such conventional actual circumstances, and provides a heat-absorbing material having high heat resistance and high wavelength selectivity, and provides a process for producing the same.

In order to solve the above-mentioned problems, the heat-absorbing material according to the present invention comprises: a heat-resistant metal having the substantially same periodic structure in a light incidence plane as the wavelength of sunlight having a specific wavelength in the wavelength regions of visible light and near-infrared rays; and a cermet formed on the light incidence plane of the above-mentioned heat-resistant metal.

Furthermore, the process for producing a heat-absorbing material according to the present invention comprises the steps of: forming the substantially same periodic structure in a light incidence plane of the heat-resistant metal as the wavelength of sunlight having a specific wavelength in the wavelength regions of visible light and near-infrared rays; and film-forming a cermet on the light incidence plane of the above-mentioned heat-resistant metal.

Furthermore, the heat-absorbing material according to the present invention comprises: a heat-resistant metal; and an inorganic film formed on a light incidence plane of the heat-resistant metal, allowing visible light to be transmitted therethrough, and reflecting near-infrared and mid-infrared rays having a wavelength longer than at least 2.3 μm.

Furthermore, the process for producing a heat-absorbing material according to the present invention comprises: a heat-resistant metal preparation step of preparing a heat-resistant metal; and an inorganic film formation step of forming an inorganic film on a light incidence plane of the heat-resistant metal, the inorganic film allowing visible light to be transmitted therethrough, and reflecting near-infrared and mid infrared rays having a wavelength longer than at least 2.3 μm.

EFFECTS OF INVENTION

According to the present invention, there can be achieved desired absorption and radiation characteristics being such that absorption is performed in the visible light region meanwhile reflection is performed in the infrared region. Furthermore, a cermet does not need a complicated film-formation control, and hence high heat-resistance can be maintained. Furthermore, according to the present invention, sunlight having a wavelength longer than at least 2.3 μm is reflected on the inorganic film and also the heat radiation of the heat-resistant metal is reflected on the inorganic film, whereby the absorptivity of the heat-absorbing material to infrared rays can be lowered, and high heat resistance and high wavelength selectivity can be achieved.

DETAILED DESCRIPTION OF THE INVENTION

Figure 1:
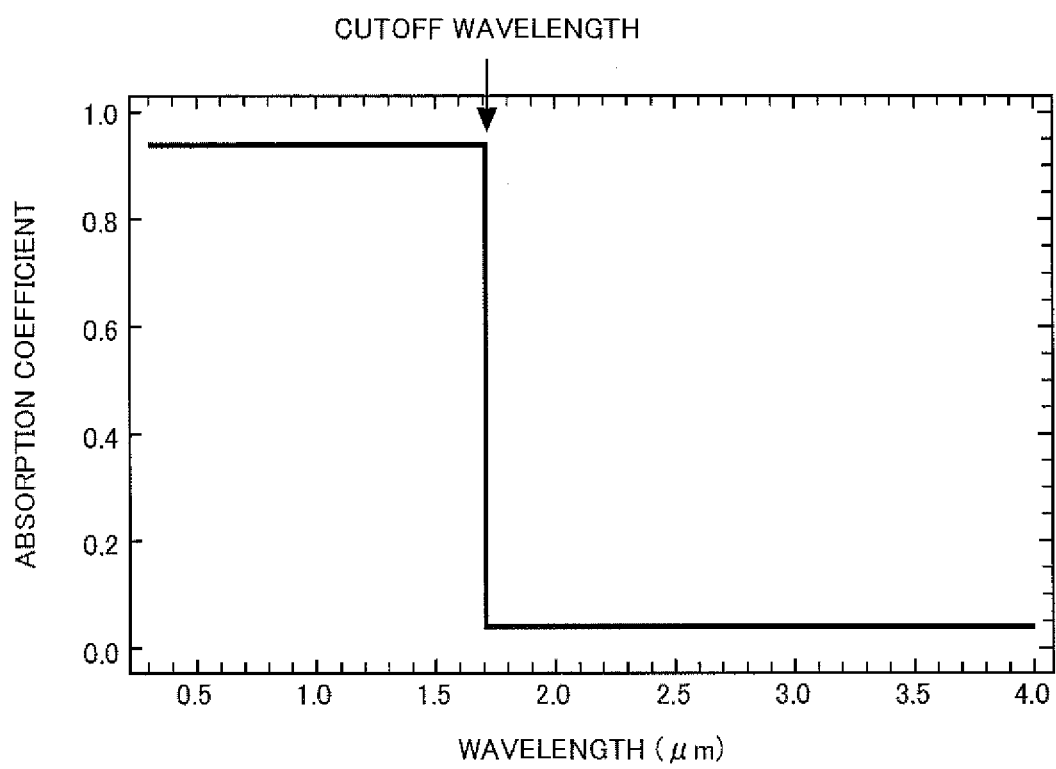
FIG. 1 illustrates a graph showing an absorption coefficient having an ideal wavelength selectivity.

Hereinafter, embodiments according to the present invention will be described in detail in the following order.

<First embodiment>
1-1. Wavelength selectivity
1-2. Heat-absorbing material
1-3. Process for producing the heat-absorbing material
1-4. Examples
<Second embodiment>
2-1. Heat-absorbing material
2-2. Process for producing the heat-absorbing material In the present description, visible light has a lower wavelength bound of 360 nm to 400 nm and an upper wavelength bound of 760 nm to 830 nm (JIS Z8120). Furthermore, infrared rays have a wavelength of 0.7 μm to 1000 μm, and are categorized into near-infrared rays, mid-infrared rays, and far-infrared rays by wavelength. Near-infrared rays have a wavelength of approximately 0.7 to 2.5 μm, mid-infrared rays have a wavelength of approximately 2.5 to 4 μm, and far-infrared rays have a wavelength of approximately 4 to 1000 μm. Furthermore, a relationship among transmission, reflection, and absorption is such that, when the rates of reflection, absorption, and transmission caused with respect to unit incident energy are regarded as reflectivity, absorptivity, and transmissivity, respectively, the relationship of reflectivity+absorptivity+transmissivity=1 holds.

<First Embodiment>
<1-1. Wavelength Selectivity>

As indexes indicating the performance of a wavelength selective material which absorbs sunlight and itself does not radiate heat, there are solar absorptivity and total emissivity.

Solar absorptivity $\alpha_s$ is an index indicating the efficiency of absorption of sunlight, and is expressed by the following formula (1).

[Formula 1]

$$\alpha_S = \frac{\int_0^\infty \alpha_\lambda(\lambda) E_{s\lambda}(\lambda) d\lambda}{\int_0^\infty E_{s\lambda}(\lambda) d\lambda} \quad (1)$$

In the formula (1), $\alpha_\lambda(\lambda)$ represents the monochromatic absorptivity of a receiver, and $E_{s\lambda}(\lambda)$ represents the monochromatic emissive power of solar radiation. The solar absorptivity $\alpha_s$ represents an absorption coefficient in the whole range of wavelengths of sunlight, and, the closer to 1 a value of solar absorptivity is, the more sunlight is absorbed.

Furthermore, total emissivity $\epsilon_h(T)$ represents a coefficient of conversion of heat into light at a certain equilibrium temperature T, and is expressed by the following formula (2).

[Formula 2]

$$\varepsilon_h(T) = \frac{\int_0^\infty \varepsilon_\lambda(\lambda) E_{b\lambda}(\lambda, T) d\lambda}{\int_0^\infty E_{s\lambda}(\lambda, T) d\lambda} \quad (2)$$

In the formula (2), $\epsilon_\lambda(\lambda)$ represents the monochromatic emissivity of a receiver, and $E_{b\lambda}(\lambda)$ represents the monochromatic emissive power of black body radiation. The higher total emissivity $\epsilon_h(T)$ indicates the escape of more heat converted into light.

Furthermore, a wavelength selectivity coefficient $\alpha_s/\epsilon_h$ is also an important index. The larger value of the wavelength selectivity coefficient indicates that a receiver easily absorbs sunlight and does not easily cool down, and thus solar heat can be more efficiently used.

The present embodiment aims to achieve a wavelength-selective receiver material, the material having solar absorptivity $\alpha_s$ and a wavelength selectivity coefficient $\alpha_s/\epsilon_h$ satisfying the following formulas (3) and (4), respectively.

[Formula 3]

$$\alpha_s > 0.9 \quad (3)$$

[Formula 4]

$$\alpha_s/\epsilon_h > 5 \quad (4)$$

Next, assuming an ideal wavelength selectivity shown in FIG. 1, the performance index of a receiver is calculated. A material having the above-mentioned ideal wavelength selectivity has an absorption coefficient of 0.95 in the visible region and an absorption coefficient of 0.05 in the infrared region. Here, a wavelength (1.7 μm in FIG. 1) at the point where a region is shifted to another region is called a cutoff wavelength.

Figure 2:
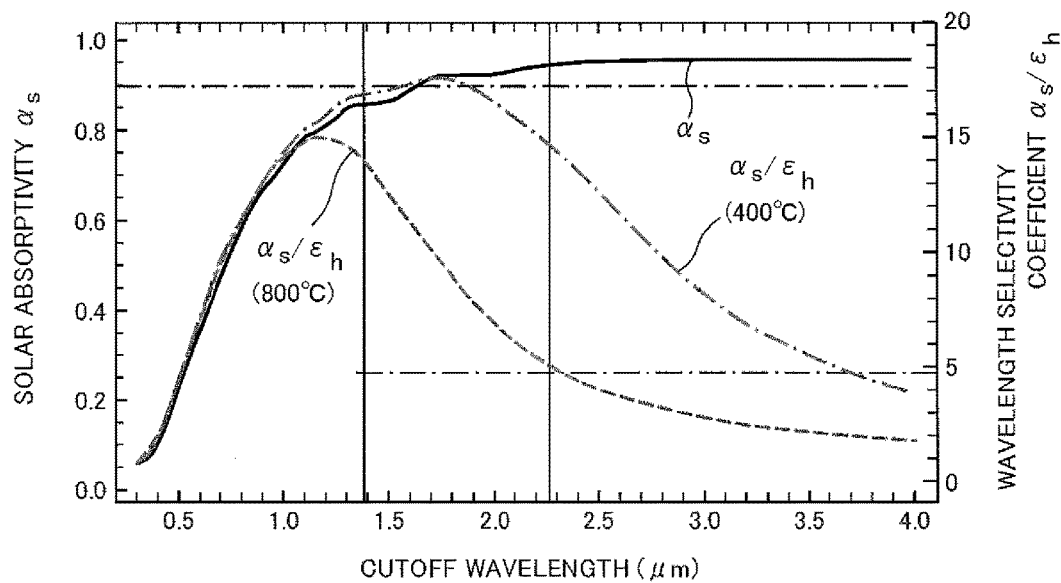
FIG. 2 illustrates a graph showing calculation results of receiver's performance indexes versus a cutoff wavelength.

FIG. 2 illustrates a graph showing calculation results of the performance indexes of a receiver with respect to a cutoff wavelength. In the figure, a thick line represents solar absorptivity $\alpha_s$, and a solid line and a dotted line represent the wavelength selectivity coefficients $\alpha_s/\epsilon_h$ of receivers having temperatures of 400 degrees C. and 800 degrees C., respectively.

A longer cutoff wavelength leads to a higher solar absorptivity $\alpha_s$, and hence, when a cutoff wavelength is not less than approximately 1.4 μm, the solar absorptivity exceeds a target value of 0.9.

Furthermore, the wavelength selectivity coefficient $\alpha_s/\epsilon_h$ has a peak at a certain cutoff wavelength according to the temperature of a receiver. In the case where the receiver has a temperature of 400 degrees C., the wavelength selectivity coefficient $\alpha_s/\epsilon_h$ reaches the highest, namely, approximately 17, around a cutoff wavelength of 1.7 μm, and the wavelength selectivity coefficient $\alpha_s/\epsilon_h$ decreases at a longer cutoff wavelength side than a cutoff wavelength of 1.7 μm. When a cutoff wavelength is not more than 3.6 μm, the wavelength selectivity coefficient $\alpha_s/\epsilon_h$ at 400 degrees C. exceeds a target value of 5. On the other hand, when the receiver has a temperature of 800 degrees C., the wavelength selectivity coefficient $\alpha_s/\epsilon_h$ reaches a peak around a cutoff wavelength of 1.1 μm, and the wavelength selectivity coefficient $\alpha_s/\epsilon_h$ exceeds 5 at a cutoff wavelength of not more than 2.3 μm.

Hence, it is understood that, in the case where the receiver has a high temperature of 400 degrees C. to 800 degrees C., a cutoff wavelength is preferably not less than 1.4 μm and not more than 2.3 μm. In other words, a receiver preferably has a small absorptivity of infrared radiation having a wavelength of at least more than 2.3 μm, meanwhile the receiver preferably has a small absorptivity of infrared radiation having a wavelength of more than 1.4 μm.

<1-2. Heat-Absorbing Material>

To realize the above-mentioned ideal optical characteristics, in the present embodiment, an inorganic film is formed on a heat-resistant metal, the inorganic film allowing visible light to be transmitted therethrough and reflecting near-infrared and mid-infrared rays having a wavelength longer than at least 2.3 μm. Thus, sunlight in a region of wavelength longer that at least 2.3 μm is reflected off the inorganic film, and heat radiation of a heat-resistant metal is also reflected off the inorganic film, whereby the absorptivity of a heat-absorbing material (a receiver) to infrared radiation can be made smaller.

Figure 3:
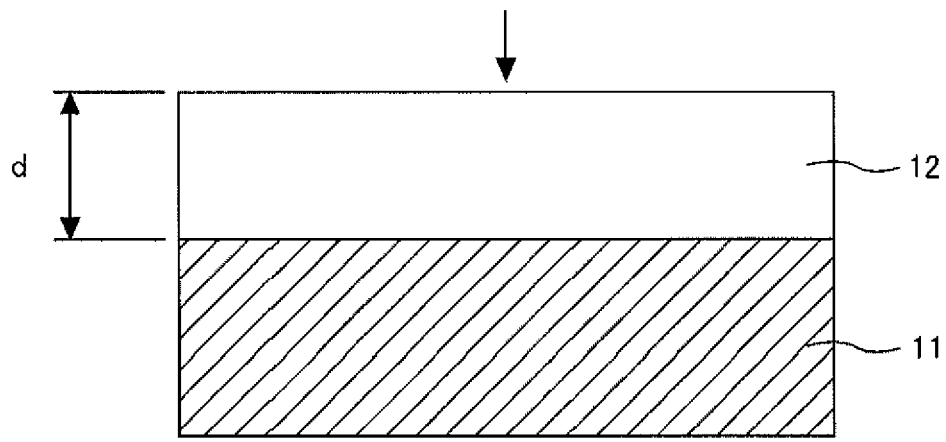
FIG. 3 is a cross-sectional view illustrating a heat-absorbing material according to the present embodiment.

FIG. 3 is a sectional view showing a heat-absorbing material according to the present embodiment. The heat-absorbing material comprises a heat-resistant metal 11 and an inorganic film 12, the inorganic film 12 being formed on the light incidence plane of the heat-resistant metal 11, allowing visible light to be transmitted therethrough, and reflecting near-infrared and mid-infrared rays having a wavelength longer than at least 2.3 μm.

The heat-resistant metal 11 comprises preferably a high melting point metal, specifically, any of tantalum Ta, tungsten W, molybdenum Mo, niobium Nb, titanium Ti, iron Fe, or an alloy containing these as a main component.

Furthermore, in the light incidence plane of the heat-resistant metal 11, there is preferably formed a periodic fine-rugged surface pattern which is two-dimensionally arranged and has the substantially same periodic structure as the wavelength of sunlight having a specific wavelength in the wavelength regions of visible light and near-infrared rays. Thus, a high absorptivity can be achieved in the wavelength regions of visible light and near-infrared rays.

Furthermore, a plurality of cavities constituting the fine-rugged surface pattern has a predetermined depth and the substantially same opening diameter as the wavelength of sunlight having a specific wavelength in the wavelength regions of visible light and near-infrared rays. The specific size of the cavity is not less than 200 nm and not more than 800 nm in diameter, preferably not less than 200 nm and not more than 500 nm in diameter, and preferably not less than 100 nm in depth. The fine-rugged surface pattern preferably has a honeycomb structure in which the cavities are arranged in a honeycomb shape. Furthermore, it is beneficial that the cavities are arranged at a pitch of not more than 1 µm.

Figure 4:
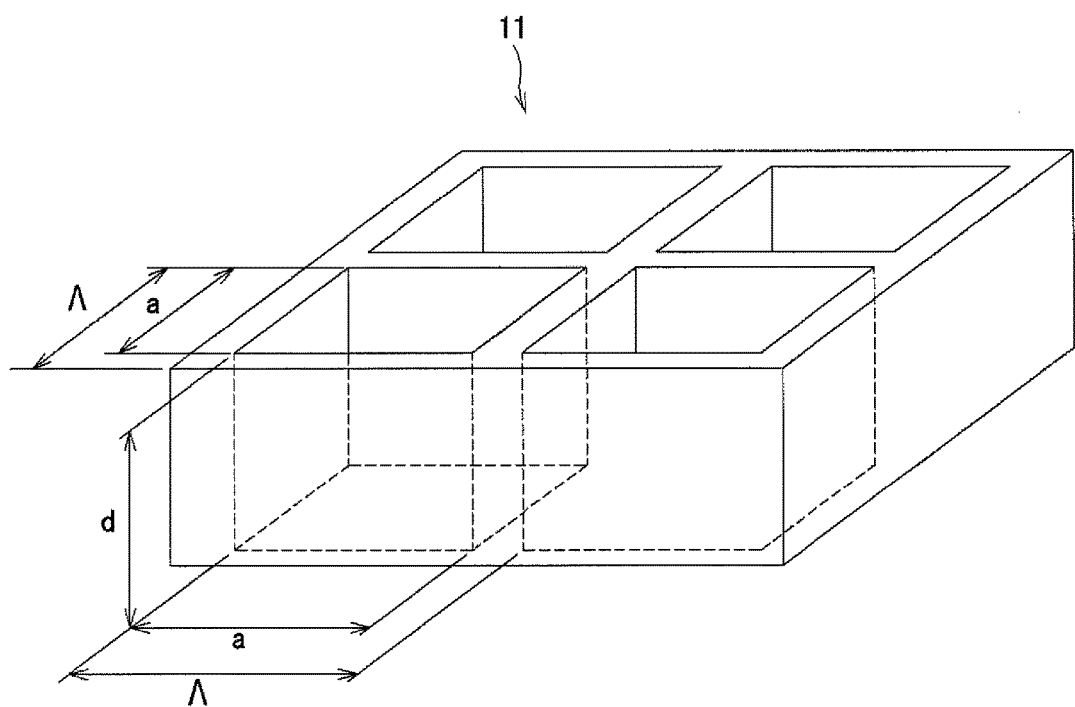
FIG. 4 is a perspective view illustrating an example of a cavity in a light incidence plane of a heat-resistant metal.

FIG. 4 is a perspective view illustrating an example of cavities in the light incidence plane of a heat-resistant metal. The cavities have a rectangular shape, and are arranged periodically and symmetrically in the x-axis and the y-axis directions. In the figure, ^ represents a structural period, a represents the size of an opening, and d represents the depth.

As described in Japanese Patent Application Laid-Open No. 2003-332607, the cavities illustrated in FIG. 4 preferably have an opening ratio (a/^) of 0.5 to 0.9 and an aspect ratio (d/a) of 0.7 to 3.0. Thus, a high absorptivity can be achieved in the wavelength regions of visible light and near-infrared rays.

The inorganic film 12 allows visible light to be transmitted therethrough, and reflects near-infrared and mid-infrared rays having a wavelength longer than at least 2.3 µm. In other words, the inorganic film 12 is preferably a material having the above-mentioned so-called cutoff wavelength of not less than 1.4 µm and not more than 2.3 µm, and thus reflects near-infrared and mid-infrared rays having a wavelength of at least more than 2.3 µm. Furthermore, the inorganic film 12 reflects near-infrared and mid-infrared rays having a wavelength of more than 1.4 µm.

Examples of such material include zinc oxide (ZnO)-based transparent conductive films, such as AZO, GZO, IZO, and FZO; indium oxide ($In_2O_3$)-based transparent conductive films, such as ITO and IFO; and tin oxide ($SnO_2$)-based transparent conductive films, such as ATO and FTO. These transparent conductive films reflect infrared radiation in a broad band of 2 µm to 20 µm.

The transparent conductive film has transparency to allow visible light to be transmitted and conductivity to allow an electric current to flow. A substance having free charged particles in the inside thereof and serving as a carrier of an electric current has a frequency specific to a material, called plasma frequency $\omega_p$. A formula (5) shows a relationship between plasma frequency $\omega_p$ and wavelength $\lambda_p$ corresponding to the plasma frequency.

[Formula 5]
$$\lambda_p \equiv \frac{2\pi c}{\omega_p} \quad (5)$$

The substance having free charged particles in the inside thereof has an optical property of reflecting and absorbing light having a longer wavelength than the wavelength $\lambda_p$ corresponding to the plasma frequency $\omega_p$, and allowing light having a shorter wavelength than the wavelength $\lambda_p$ to be transmitted. Metal has the wavelength $\lambda_p$ in the ultraviolet region, and reflects and absorbs visible light. On the other hand, the transparent conductive film has the wavelength $\lambda_p$ in the infrared region, and allows visible light to be transmitter therethrough. Furthermore, the wavelength $\lambda_p$ corresponding to the plasma frequency $\omega_p$ serves as the above-mentioned so-called cutoff wavelength.

Hence, the transparent conductive film preferably has the wavelength $\lambda_p$, corresponding to the plasma frequency $\omega_p$, of not less than 1.4 µm and not more than 2.3 µm. Thus, visible light is allowed to be transmitted, and also, infrared radiation having a wavelength longer than at least 2.3 µm can be reflected.

Furthermore, the transparent conductive film is stable as a substance and has high heat resistance, and therefore can achieve excellent wavelength selectivity even at high temperatures of 400 degrees C. to 800 degrees C.

Furthermore, the inorganic film 12 has a film thickness d of preferably not less than 50 nm, more preferably not less than 500 nm. The inorganic film 12 having a greater film thickness d can achieve an improvement in the absorptivity of visible light. In the case where the above-mentioned fine-rugged surface pattern is formed in the light incidence plane of the heat-resistant metal 11, a plurality of cavities constituting the fine-rugged surface pattern is preferably embedded in the inorganic film 12, and the outermost surface of the inorganic film 12 is preferably made flat. Thus, the wavelength selectivity coefficient $\alpha_s/\epsilon_h$ at a high temperature can be increased.

<1-3. Process for Producing the Heat-Absorbing Material>

A process for producing the heat-absorbing material according to the present embodiment comprises: a heat-resistant metal preparation step of preparing a heat-resistant metal; and an inorganic film formation step of forming an inorganic film on a light incidence plane of the heat-resistant metal, the inorganic film allowing visible light to be transmitted therethrough, and reflecting near-infrared and mid-infrared rays having a wavelength longer than at least 2.3 µm.

In the heat-resistant metal preparation step, a periodic fine-rugged surface pattern is preferably formed in a light incidence plane of a heat-resistant metal by interference exposure and wet etching, the fine-rugged surface pattern being two-dimensionally arranged and having the substantially same periodic structure as the wavelength of sunlight having a specific wavelength in the wavelength regions of visible light and near-infrared rays.

A specific process of forming the fine-rugged surface pattern by interference exposure and wet etching comprises: a photoresist application step of applying a photoresist in the form of thin film on a substrate; an interference exposure step of subjecting the photoresist to interference exposure; a development step of removing an unnecessary portion of the photoresist by development; an electrochemical wet etching step of immersing a photoresist substrate after the development, and performing electrochemical wet etching; and a photoresist removal step of removing the photoresist on the substrate after the electrochemical wet etching. Thus, without using a vacuum apparatus, cavities can be processed at very low cost.

In the inorganic film formation step, a transparent conductive film is preferably formed by a sol gel process. Specifically, a sol gel process comprises: a dissolution step of dissolving a metal constituting a transparent conductive film into acetylacetone thereby to produce an acetylacetone complex; an application-to-substrate step of applying a solution containing the acetylacetone complex to a substrate; a pre-bake step of evaporating a solvent thereby to make a film dense; and a calcining step of calcining at a high temperature thereby to obtain a transparent conductive film.

In the application-to-substrate step, any of a spin coating method and a dip coating method may be used. Furthermore, if the solution is applied too thickly in the application-to-substrate step, cracking occurs, and therefore, to achieve a thicker film thickness, it is preferable to apply the solution thinly and perform calcining, then recoat the solution.

According to such sol gel process, in the case where a transparent conductive film is formed on a metal surface in which cavities are formed, embedding the cavities in the transparent conductive film and making the outermost surface thereof planar enable the absorptivity of visible light to be increased and the absorptivity in the infrared region to be considerably reduced. Furthermore, even if cavities are made of a heat-resistant metal, the cavities exposed to the air are deformed due to a high temperature, or the surfaces thereof are oxidized, but, by embedding metal cavities in a transparent conductive film, the problem of heat resistance can be reduced. Furthermore, according to the sol gel process, an ITO film having a large area can be inexpensively film-formed, and accordingly a heat-absorbing material having a large area can be produced.

<1-4. Examples>

Hereinafter, Examples according to the present invention will be described in the following order. It should be noted that the present invention is not limited to these Examples.

1-4-1 Heat-absorbing material having an ITO film formed on Ta 1-4-2 Heat-absorbing material having an ITO film formed on a cavity-processed metal 1-4-3 Cavity processing by interference exposure and electrochemical wet etching 1-4-4 Formation of a transparent conductive film by sol gel process <1-4-1 Heat-Absorbing Material Having an ITO Film Formed on Ta>

There were simulated the optical characteristics of the above-mentioned heat-absorbing material illustrated in FIG. 3 in which Ta is used as the heat-resistant metal 11 and ITO is used as the inorganic film 12. Ta is a metal having a high melting point, high acid resistance, and the lowest reflectivity of visible light among pure metals.

The simulation of the optical characteristics was conducted by a numerical analysis based on Rigorous Coupled-Wave Analysis (hereinafter, referred to as a RCWA method), which is an exact solution of the Maxwell equation.

Figure 5:
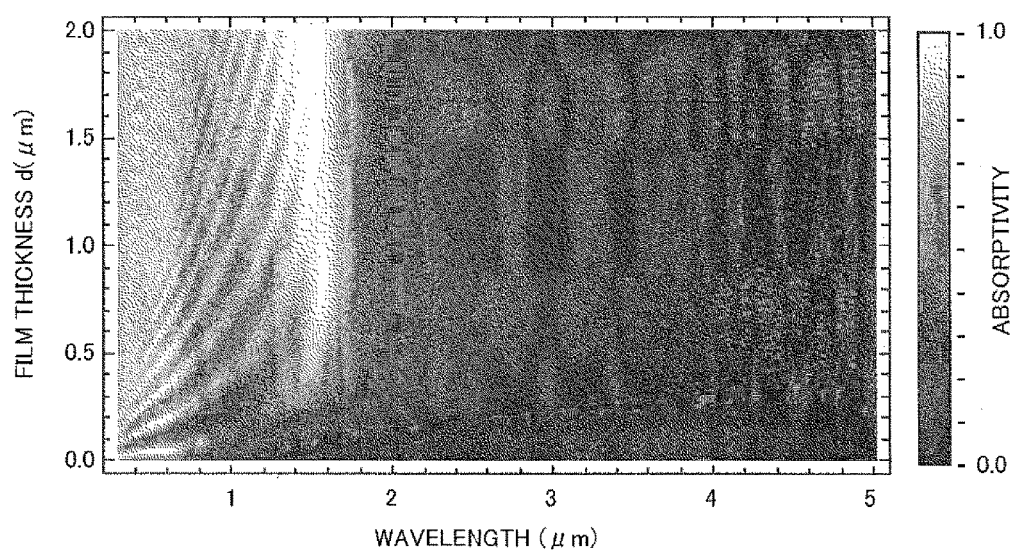
FIG. 5 illustrates a graph showing the absorptivity in the case of letting light come at 0 degrees with respect to a heat-absorbing material in which an ITO film is formed on Ta.

FIG. 5 illustrates a graph showing the absorptivity in the case of letting light come at 0 degrees to a heat-absorbing material in which an ITO film is formed on Ta. In the figure, the horizontal axis represents wavelength and the vertical axis represents the film thickness of ITO, and black represents a low absorptivity and white represents a high absorptivity. As shown in FIG. 5, the absorptivity is low in the infrared region having a wavelength of approximately not less than 1.7 µm, meanwhile the absorptivity is high at a shorter wavelength than the above-mentioned wavelength, and thus this is not dependent on the film thickness of ITO. Furthermore, it is understood that a film thickness of ITO of not less than 500 nm leads to the absorptivity of visible light to be higher.

Figure 6:
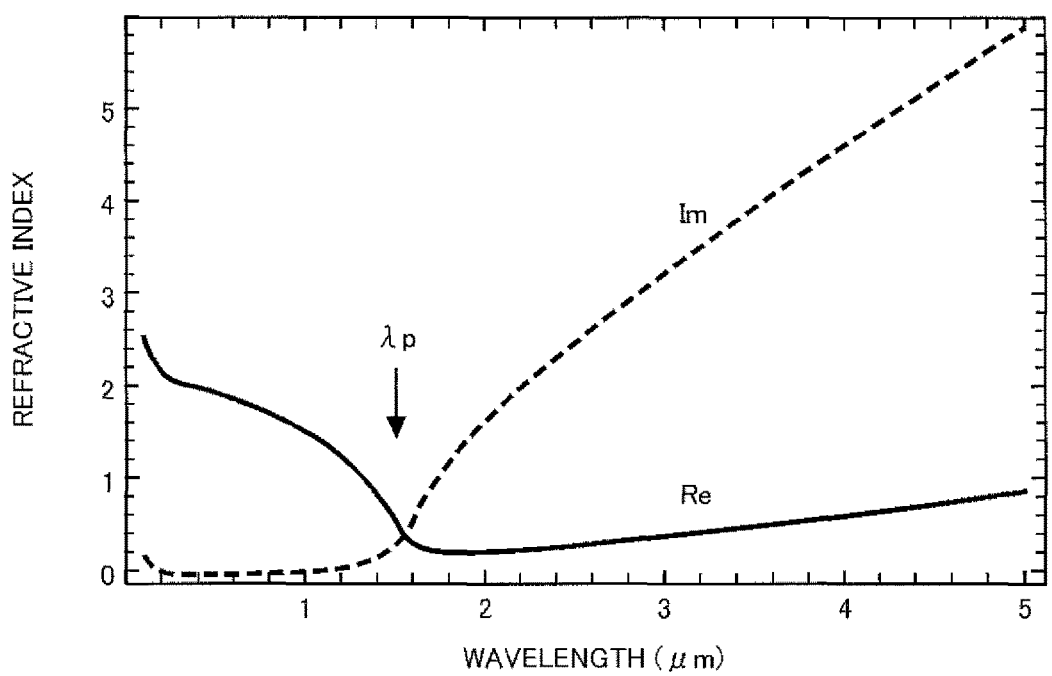
FIG. 6 illustrates a graph showing values of the real part and the imaginary part of the complex refractive index of ITO.

Next, using the complex refractive index of ITO shown in FIG. 6, an ideal cutoff wavelength shown in FIG. 5 was verified. In the figure, a solid line represents values of the real part of the complex refractive index, and a dotted line represents values of the imaginary part of the complex refractive index. The values of the imaginary part become closer to zero at a shorter wavelength side than 1.7 µm, meanwhile the values of the real part become larger thereat.

The wavelength around 1.7 µm is the wavelength $\lambda_p$ corresponding to the plasma frequency $\omega_p$, shown in the above-mentioned formula (5).

At a wavelength shorter than the wavelength $\lambda_p$, values of the imaginary part are approximately 0 (this time, values of $10^{-3}$ or smaller may be regarded as 0.), and hence, the ITO film is transparent. Such wavelength dependency of the refractive index is typical of a transparent conductive oxide, and, for example, the same results are obtained also in the case of using ZnO (Zinc Oxide).

Figure 7:
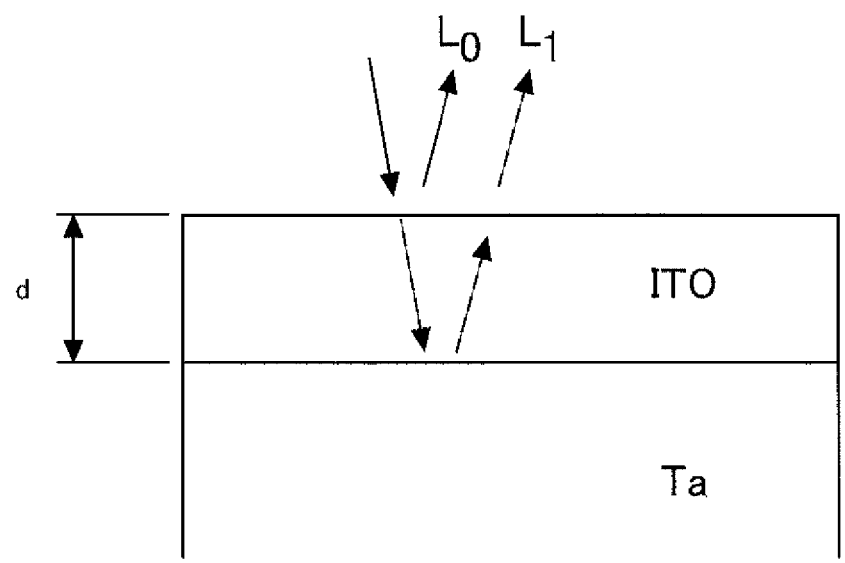
FIG. 7 is a cross-sectional view for explaining anti-reflection conditions.
Figure 8:
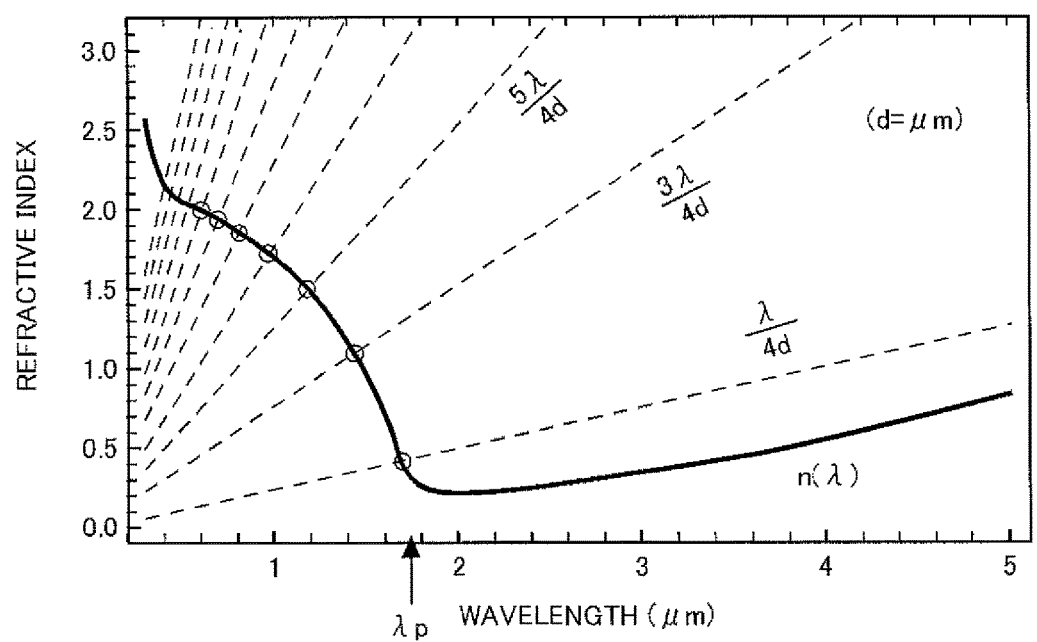
FIG. 8 illustrates a graph showing the conditions of anti-reflection using the complex refractive index of ITO.

Next, using FIG. 7 and FIG. 8, the film thickness of ITO was verified. As shown in FIG. 7, letting the film thickness of ITO be d and the refractive index be n ($\lambda$), conditions for anti-reflection were verified.

When the phase of light $L_0$ (solid arrow) entering at approximately 0 degrees and reflecting on the surface of ITO and the phase of light $L_1$ (dashed arrow) entering the inside of the ITO, reflecting on the interface between the ITO and Ta, and going outside are reversed, the phases cancel each other, whereby reflected light is reduced. In other words, light is enclosed inside the ITO, and the ratio of light absorbed in the surface of Ta is increased.

A state in which the phases are reversed is equivalent to a state in which, as shown in the formula (6), the length of an optical path to move back and forth in the ITO is equal to an odd half-integer multiple of the wavelength.

[Formula 6]

$$2n(\lambda)d = \frac{2m+1}{2}\lambda \quad (6)$$

$$m = 0, 1, 2, \ldots$$

This formula (6) is also expressed as a formula (7).

[Formula 7]

$$n(\lambda) = \frac{2m+1}{4d}\lambda \quad (7)$$

The imaginary part of the refractive index does not contribute to the phases, and hence, the left-hand side of the formula may be regarded as the real part of the complex refractive index of ITO shown in FIG. 6. On the other hand, the right-hand side of the formula represents a straight line having a different slope depending on an integer m, and, as shown in FIG. 8, an intersection point of the real part of the refractive index and the straight line expressed in the right-hand side of the formula (7) corresponds to a condition for anti-reflection. Furthermore, as shown in FIG. 8, the intersection points concentrate in a region in which the refractive index has a steep negative inclination to wavelength. Specifically, the refractive index decreases by not less than 1.0 in a wavelength range from 0.5 µm to 2 µm. Such wavelength dependency of the refractive index of ITO leads to a characteristic which is such that wavelengths satisfying the condition for anti-reflection concentrate at a shorter wavelength side than the wavelength $\lambda_p$ corresponding to the plasma frequency $\omega_p$. And, the wavelength $\lambda_p$ just corresponding to the plasma frequency $\omega_p$ plays a role as a cutoff wavelength. Furthermore, because of this characteristic, there can be also obtained an advantageous characteristic which is such that a cutoff wavelength is determined, hardly depending on the film thickness of ITO.

Figure 9:
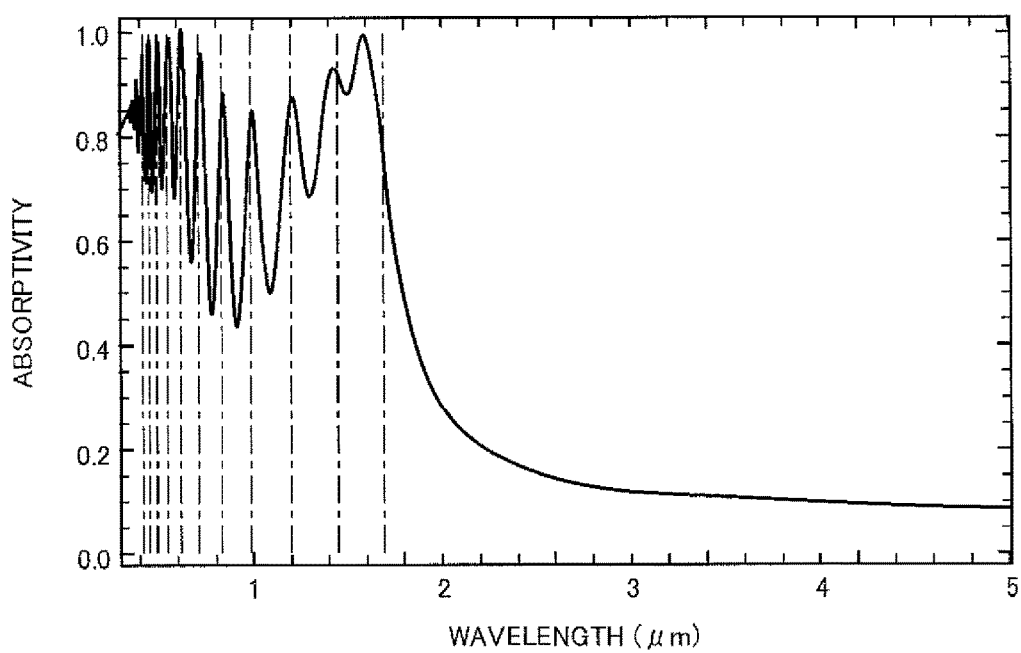
FIG. 9 illustrates a graph showing the spectrum of absorptivity in the case where the film thickness of ITO is 1 μm.

FIG. 9 illustrates a graph showing the wavelength dependency of absorptivity in the case where the film thickness of ITO is 1 μm. In the figure, a solid line represents the absorptivity when the film thickness d shown in FIG. 5 is 1 μm, meanwhile dot-and-dash lines represent wavelengths which are solutions of the formula (6) when the film thickness is 1 μm. It is understood that the wavelengths of the peaks of the absorptivity approximately coincide with the solutions. The reason why the agreement between the wavelengths and the solutions is not perfect is that a phase changes at the time of reflection at the interface between ITO and Ta, whereby multiple reflection is caused inside the ITO layer.

The so-called cutoff wavelength of such ITO film does not appear in a mere oxide film. The presence of this $\lambda_p$ is intrinsic to the ITO film.

Next, to confirm the above-mentioned simulation results, heat-absorbing materials were produced. Ta films having a film thickness of approximately 100 nm were formed on quartz substrates by sputtering, and, on each of the films, ITO films having a film thickness of 80 nm and 400 nm were formed, respectively.

Figure 10:
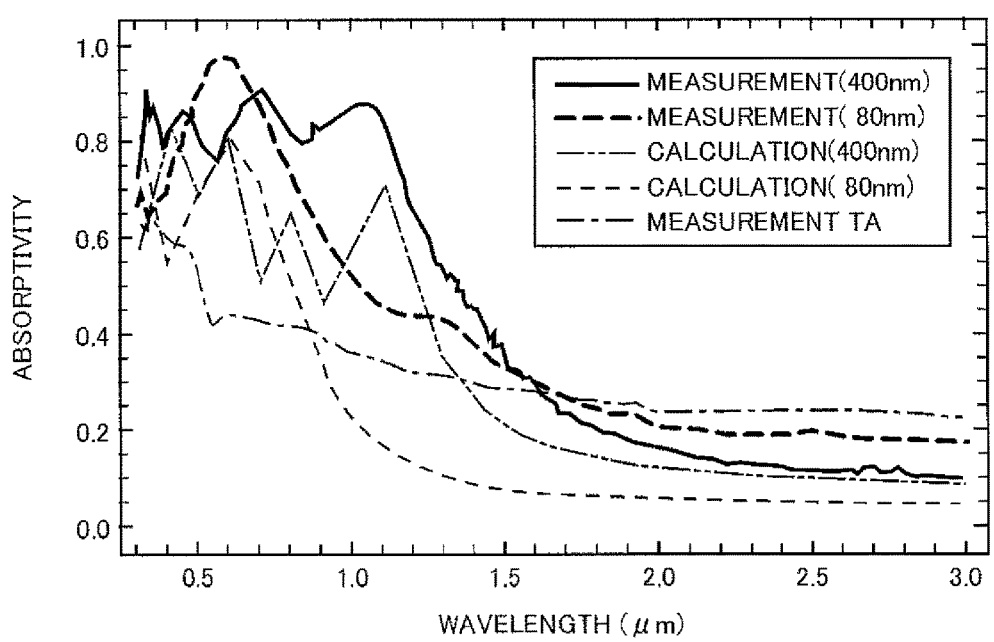
FIG. 10 illustrates a graph showing measurement results of the absorptivity of a heat-absorbing material in which an ITO film is formed on Ta.
Figure 11A:
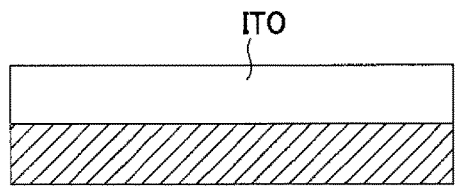
FIG. 11A to FIG. 11E illustrate fine structure models of metal surfaces.
Figure 11B:
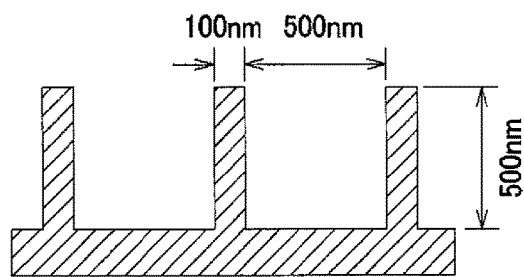
Figure 11C:
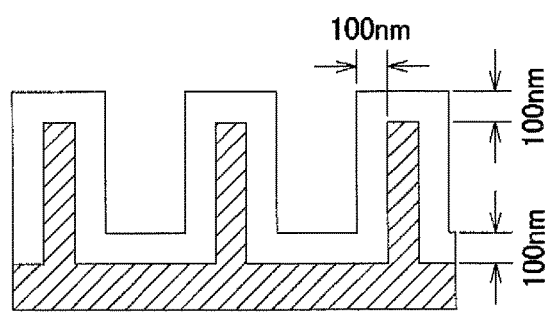
Figure 11D:
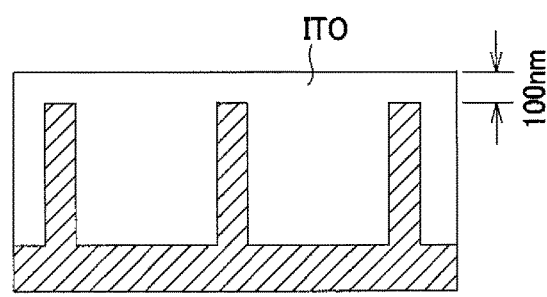
Figure 11E:
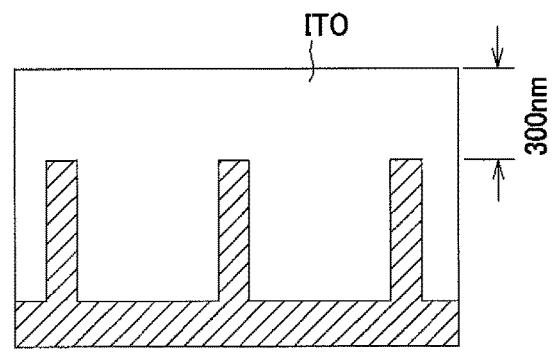

FIG. 10 illustrates a graph showing the measurement results of the absorptivity of the heat-absorbing materials in which the ITO films were formed on Ta. The figure shows the simulation results (calculation results) and the measurement results of Ta on which no ITO film was formed. The heat-absorbing materials in which the ITO films were formed on Ta had a higher absorptivity of visible light and a lower absorptivity of infrared rays, compared to the heat-absorbing material in which only Ta was film-formed.

Table 1 shows the performance indexes of solar absorptivity $\alpha_s$ and a wavelength selectivity coefficient $\alpha_s/\epsilon_h$.

TABLE 1

|  | $\alpha_s$ | $\epsilon_h$ | | $\alpha_s/\epsilon_h$ | |
| --- | --- | --- | --- | --- | --- |
|  |  | 400° C. | 800° C. | 400° C. | 800° C. |
| Ta/ITO(80 nm) | 0.70 | 0.19 | 0.22 | 3.58 | 3.18 |
| Ta/ITO(400 nm) | 0.76 | 0.13 | 0.17 | 5.93 | 4.43 |
| Ta only | 0.43 | 0.24 | 0.25 | 1.78 | 1.71 |

As shown in Table 1, in the heat-absorbing materials in which the ITO films were formed on Ta, both of the performance indexes of solar absorptivity $\alpha_s$ and a wavelength selectivity coefficient $\alpha_s/\epsilon_h$ were considerably improved, compared to the heat-absorbing material in which only Ta was film-formed. Furthermore, it was found that the heat-absorbing materials in which the ITO films were formed on Ta exhibited higher performance indexes at high temperatures of 400 degrees C. and 800 degrees C.

<1-4-2 Heat-Absorbing Material Having an ITO Film Formed on a Cavity-Processed Metal>

To increase the absorptivity, the use of an oxide, such as black chromium, which is inexpensive, can be considered, but, the heat-resistant temperature of the oxide is approximately 300 degrees C., and hence, it is difficult to use the oxide for solar power generation. Furthermore, it is also difficult to increase the absorptivity by using a pure metal, like case of the heat-absorbing material in which an ITO film is formed on Ta.

Therefore, as disclosed in Japanese Patent Application Laid-Open No. 2003-332607, as a process of using the heat-resistance of a metal and increasing the absorptivity, a fine structure was provided in a surface of the metal.

FIG. 11 illustrates models of the fine structures of metal surfaces. FIG. 11A illustrates a model in which an interface between a metal and a transparent conductive film is planar; FIG. 11B illustrates a model in which cavities (holes) are formed in a metal; and FIG. 11C illustrates a model in which a thin transparent conductive film is formed on metal cavities. Furthermore, FIG. 11D illustrates a model in which metal cavities are embedded in a transparent conductive film and a surface thereof is made planar, and furthermore, a transparent conductive film having a thickness of 100 nm is formed thereon; and FIG. 11E illustrates a model in which metal cavities are embedded in a transparent conductive film and a surface thereof is made planar, and furthermore, a transparent conductive film having a thickness of 300 nm is formed thereon. It should be noted that, in the model illustrated in FIG. 11C, the walls and the bottoms of the metal cavities are coated with a transparent conductive film having a thickness of 100 nm, but, the cavities are not embedded therein.

It can be considered that, qualitatively, the size (diameter) of the cavities determines the maximum value of the wavelength absorbed, and the depth of the cavities determines the absorptivity. Therefore, a too large cavity is not preferable because such cavity also absorbs wavelengths in the infrared region.

In the present Examples, the cavity had a size of 500 nm square. Furthermore, the greater the depth of the cavity is, the higher the absorptivity is, and accordingly the cavity was made to have a depth of 500 nm (aspect ratio=1). Namely, the cavities illustrated in FIG. 4 had an opening size of 500 nm and a depth of 500 nm. Furthermore, simulated were the optical characteristics of a configuration in which stainless steel (SUS304) was used as the heat-resistant metal 11 and ITO was used as the inorganic film 12.

Figure 12A:
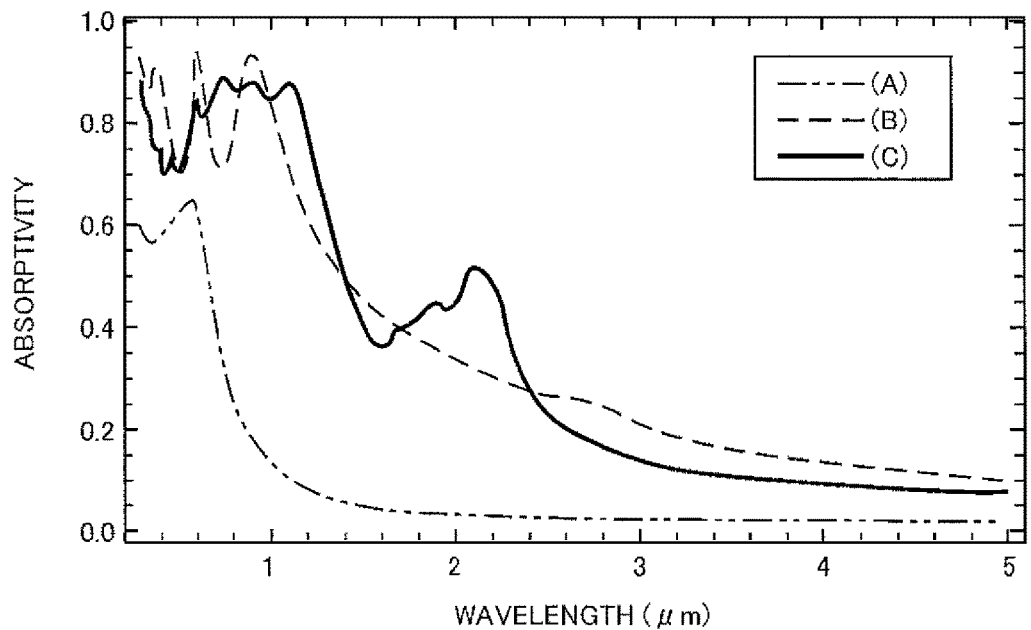
FIG. 12A and FIG. 12B illustrates a graph showing simulation results of the models illustrated in FIG. 11.
Figure 12B:
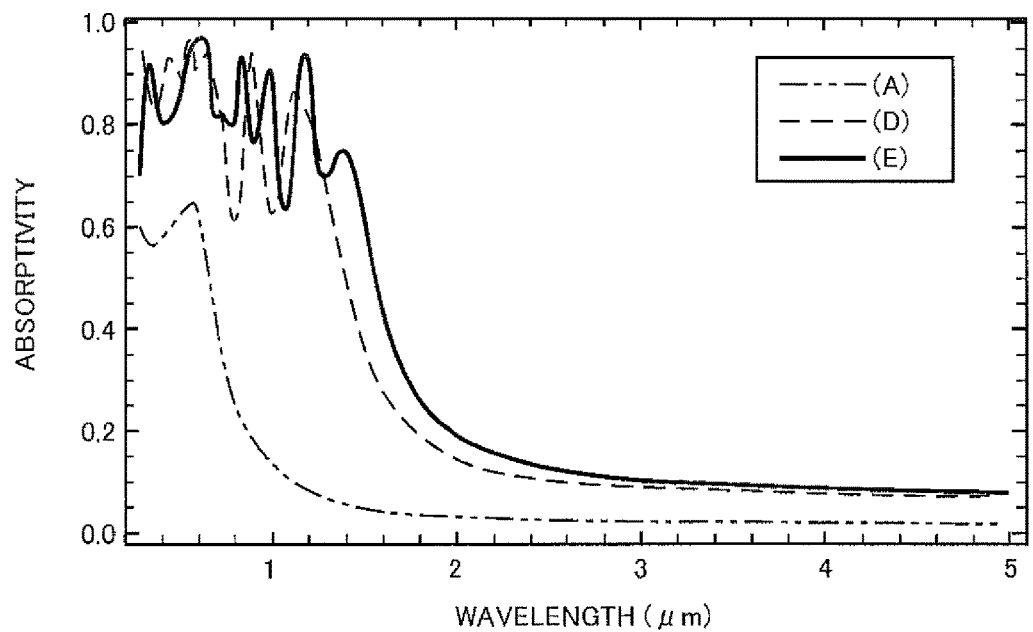

FIG. 12A illustrates a graph showing simulation results of the models (A), (B), and (C) illustrated in FIG. 11; and FIG. 12B illustrates a graph showing simulation results of the models (A), (D), and (E) illustrated in FIG. 11. As shown in FIG. 12A, the heat-absorbing materials (B) and (C) in which cavities were formed in a metal had a higher absorptivity of visible light than the heat-absorbing material (A) in which an interface between a metal and a transparent conductive film was planar. Furthermore, the heat-absorbing material (C) in which a thin transparent conductive film was formed on metal cavities had a slightly higher absorptivity of visible light than the heat-absorbing material (B) in which no transparent conductive film was formed. Furthermore, as shown in FIG. 12B, the heat-absorbing materials (D) and (E) in which metal cavities were embedded in a transparent conductive film and a surface thereof was planar had a higher absorptivity of visible light than the heat-absorbing material (A) in which an interface between a metal and a transparent conductive film was planar.

Table 2 shows the performance indexes of solar absorptivity $\alpha_s$ and a wavelength selectivity coefficient $\alpha_s/\epsilon_h$ of the models (A) to (E) illustrated in FIG. 11 at temperatures of 400 degrees C. and 800 degrees C.

TABLE 2

|  | $\alpha_s$ | $\epsilon_h$ | | $\alpha_s/\epsilon_h$ | |
| --- | --- | --- | --- | --- | --- |
|  |  | 400° C. | 800° C. | 400° C. | 800° C. |
| (A) | 0.43 | 0.24 | 0.25 | 1.78 | 1.71 |
| (B) | 0.75 | 0.12 | 0.19 | 6.15 | 3.94 |
| (C) | 0.76 | 0.08 | 0.17 | 9.37 | 4.55 |

TABLE 2-continued

| | $\alpha_s$ | $\epsilon_h$ | | $\alpha_s/\epsilon_h$ | |
| --- | --- | --- | --- | --- | --- |
| | | 400° C. | 800° C. | 400° C. | 800° C. |
| (D) | 0.77 | 0.08 | 0.11 | 9.95 | 7.20 |
| (E) | 0.80 | 0.09 | 0.13 | 8.92 | 6.10 |

As shown in Table 2, the heat-absorbing material (B) in which cavities were formed in a metal had a higher solar absorptivity $\alpha_s$ and a higher wavelength selectivity coefficient $\alpha_s/\epsilon_h$ than the heat-absorbing material (A) in which an interface between a metal and a transparent conductive film was planar. Furthermore, the heat-absorbing material (C) in which a thin transparent conductive film was formed on metal cavities had a higher wavelength selectivity coefficient $\alpha_s/\epsilon_h$ than the heat-absorbing material (B) in which no transparent conductive film was formed. Furthermore, the heat-absorbing material (D) in which metal cavities were embedded in a transparent conductive film and a surface thereof was made planar and furthermore a transparent conductive film having a thickness of 100 nm was formed thereon had a higher wavelength selectivity coefficient $\alpha_s/\epsilon_h$, particularly had a remarkably higher wavelength selectivity coefficient $\alpha_s/\epsilon_h$ at a temperature of 800 degrees C., than the heat-absorbing material (C) in which a thin transparent conductive film was formed on metal cavities. Furthermore, the heat-absorbing material (E) in which metal cavities were embedded in a transparent conductive film and a surface thereof was made planar and furthermore a transparent conductive film having a thickness of 300 nm was formed thereon had a higher solar absorptivity $\alpha_s$ than the heat-absorbing material (D) in which metal cavities were embedded in a transparent conductive film and a surface thereof was made planar and furthermore a transparent conductive film having a thickness of 100 nm was formed thereon.

<1-4-3 Cavity Processing by Interference Exposure and Electrochemical Wet Etching>

As mentioned above, the fine structure of a metal is of usefulness in controlling the absorption, but, in order to use the fine structure for a receiver for solar power generation, a meter-scale large area thereof needs to be processed. In Japanese Patent Application Laid-Open No. 2003-332607, dry etching, which requires a vacuum apparatus, is used for cavity processing, and, in order to increase an area to be processed, a larger vacuum apparatus is required.

Therefore, wet etching was tried to be used as a more inexpensive production process. Generally, wet etching has been considered to be unsuitable for fine patterning of not more than 1 μm, but, this time, the optimizing of etching conditions and the like enabled the fine patterning.

Figure 13:
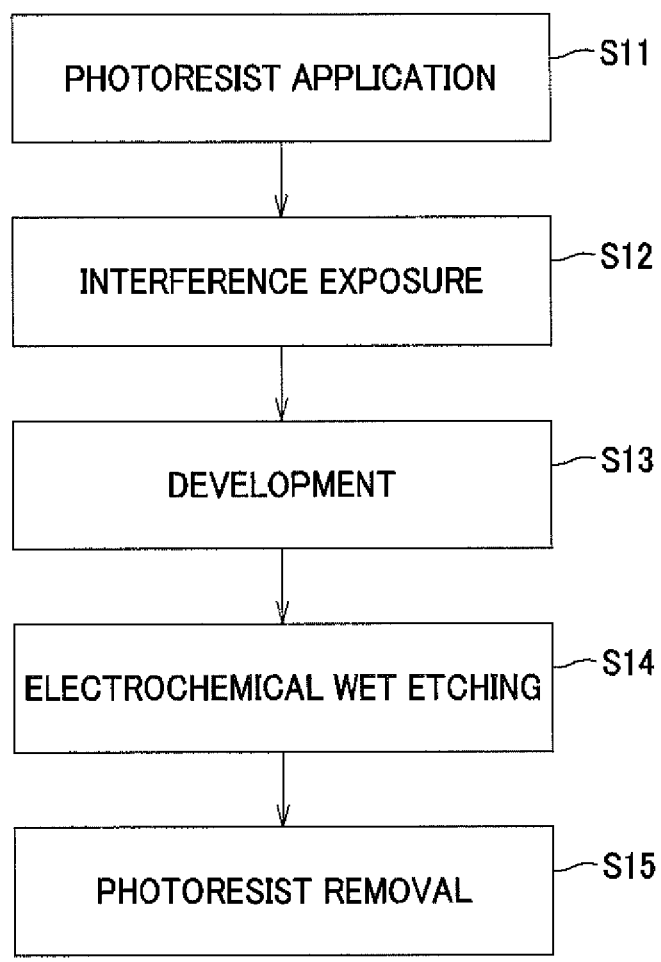
FIG. 13 is a flow chart showing a process of fine patterning of metal.

FIG. 13 is a flow chart showing a process of fine patterning of a metal. As long as a cavity has a sufficient depth, the absorptivity is not dependent on metal material, and therefore, in this Example, stainless steel (SUS304), a large area of which was more inexpensively available than Ta, was used as a substrate.

In the photoresist application step (S11), KrF photoresist was applied in the form of a thin film on a substrate. In the subsequent interference exposure step (S12), the KrF photoresist was subjected to interference exposure using an interference exposure apparatus (light source for interference exposure: 266 nm (YAG 4x), CW oscillation). Performing interference exposure twice with changing the orientation of the substrate by 90 degrees enables a two-dimensional arrangement of openings. Interference fringes are generated in such a manner that not two but three beams used for generating interference fringes and the beams are entered so as to be rotationally symmetric to the direction of the normal to the substrate, whereby openings can be arranged in the form of honey comb, and the density of the cavity arrangement can be increased. Furthermore, cavities each having a circular opening may be arranged. It should be noted that the relationship between a pitch pa of openings in the case of using three beams and a pitch pi in the case of using two beams is expressed by the formula (8).

[Formula 8]

$$p_a = \frac{\sqrt{3}}{2} p_i \qquad (8)$$

Figure 14:
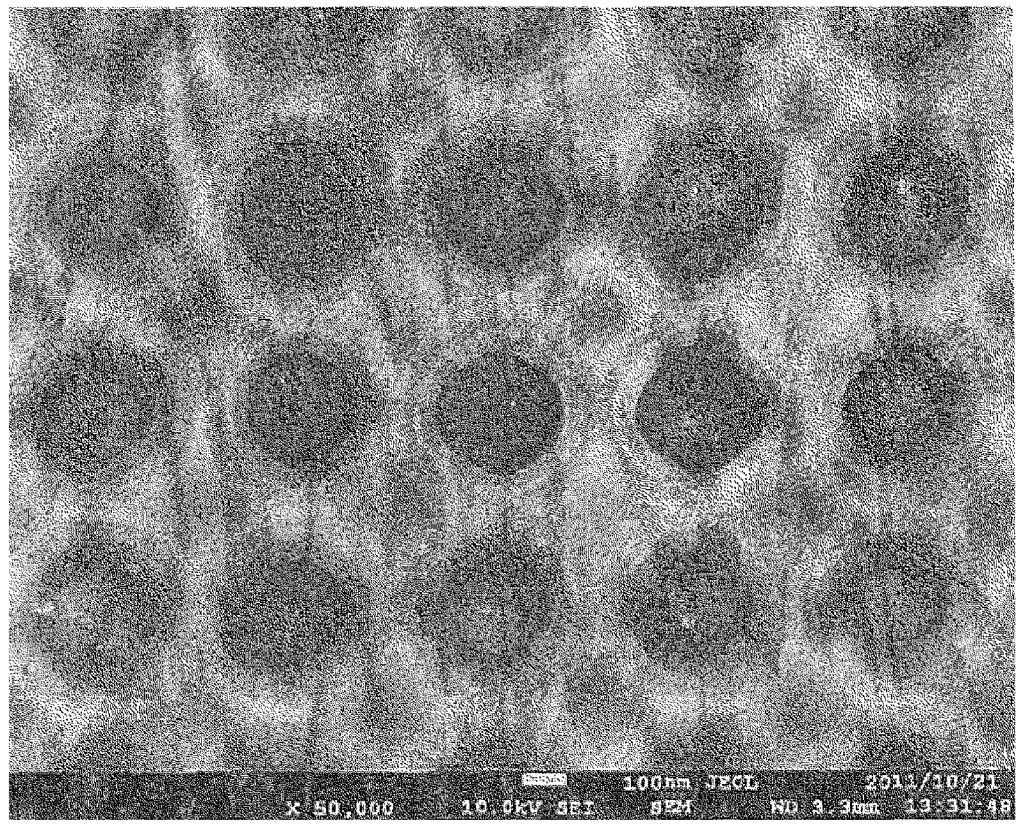
FIG. 14 is a SEM photograph showing a state of a photoresist after development.

In the subsequent development step (S13), an unnecessary portion of the photoresist was removed by development. FIG. 14 is a SEM photograph showing a state of the photoresist after the development. Holes are formed in the photoresist at a pitch of approximately 500 nm, and stainless steel serving as a base material appears.

In the subsequent electrochemical wet etching step (S14), a photoresist substrate after the development was immersed into a 1% oxalic acid solution to perform electrochemical wet etching. The electrochemical wet etching was performed by applying a voltage of 2.3V between the substrate and an electrode for 30 seconds.

Figure 15:
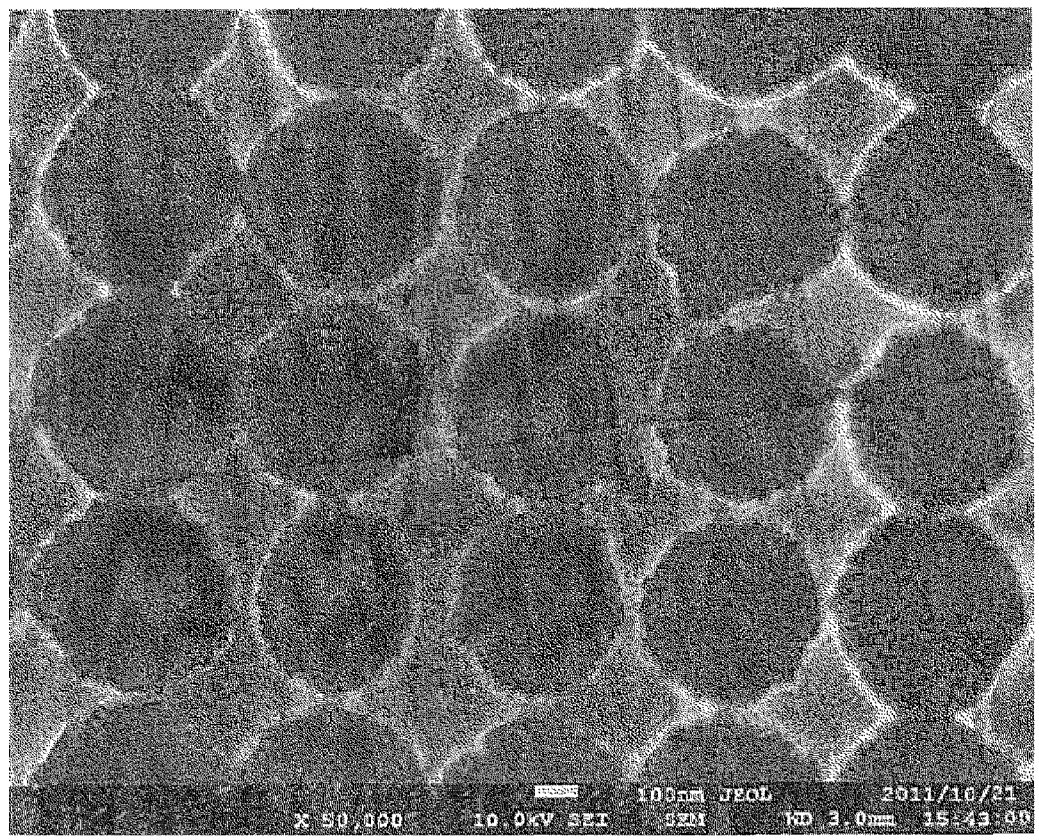
FIG. 15 is a SEM photograph of a stainless steel substrate in which a photoresist is removed after wet etching.

In the subsequent photoresist removal step (S15), the photoresist left on the substrate after the electrochemical wet etching was removed. FIG. 15 is a SEM photograph of the stainless steel substrate in which the photoresist is removed after the wet etching. It is understood that a pattern is transferred on the substrate and cavities are formed.

Figure 16:
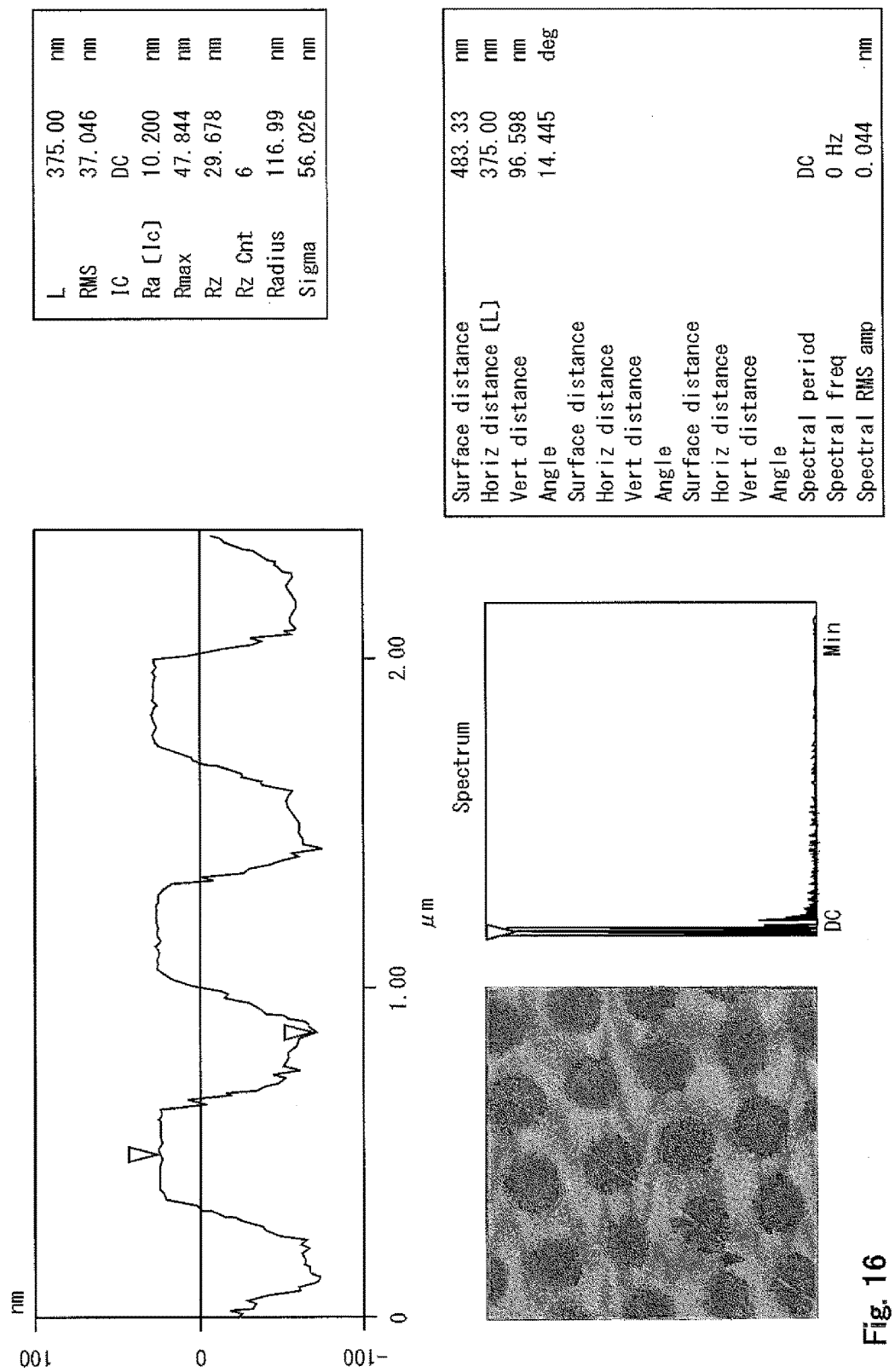
FIG. 16 shows a profile of a stainless steel substrate by AFM (atomic force microscope).

FIG. 16 shows a profile of the stainless steel substrate by AFM (atomic force microscope). It is understood that the depth of the substrate is approximately 100 nm.

As mentioned above, the use of stainless steel as a heat-resistant metal and the application of interference exposure and electrochemical wet etching enable cavities to be processed without using a vacuum apparatus and at very low cost.

<1-4-4 Formation of Transparent Conductive Film by Sol Gel Process>

Sputtering, a PLD (Pulse Laser Deposition) method, or the like is applied for the formation of a transparent conductive film for an optical use, but, area enlargement is still not easy. Therefore, in this Example, a sol gel process was tried, whereby an ITO film was formed on a quartz substrate.

Figure 17:
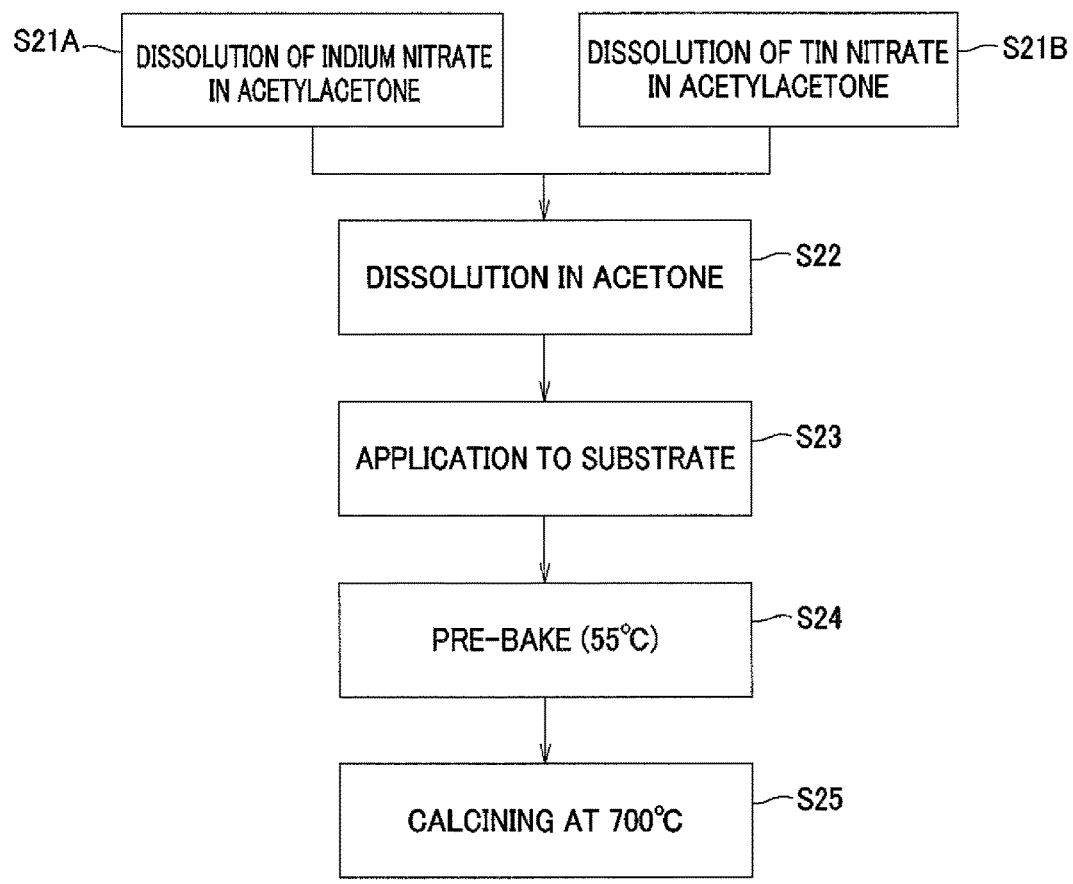
FIG. 17 is a flow chart showing the steps of a sol gel process.

FIG. 17 is a flow chart showing the steps of the sol gel process. In a dissolution-in-acetylacetone step (S21), indium nitrate was dissolved in acetylacetone (S21A) and also tin nitrate was dissolved in acetylacetone (S21B). In a subsequent dissolution-in-acetone step (S22), an acetylacetone complex of indium and an acetylacetone complex of tin were mixed. In a subsequent application-to-substrate step (S23), the acetylacetone complexes of indium and tin were applied to the substrate by spin coating. In a subsequent pre-bake step (S24), a solvent was evaporated at a temperature of 55 degrees C. thereby to make the film dense. In a subsequent calcining step (S25), calcining was performed at a temperature of 700 degrees C., thereby removing an organic ingredient to obtain an ITO film.

In this sol gel process, too thick application of the complexes in the application-to-substrate step (S23) would cause a crack, and therefore, the complexes were thinly applied and baked, and recoated, whereby the film was made thicker.

According to this sol gel process, in the case where a transparent conductive film is formed on a metal surface in which cavities are formed, the cavities can be embedded and the outermost surface can be planar, and thus a computation model can be reproduced.

Figure 18:
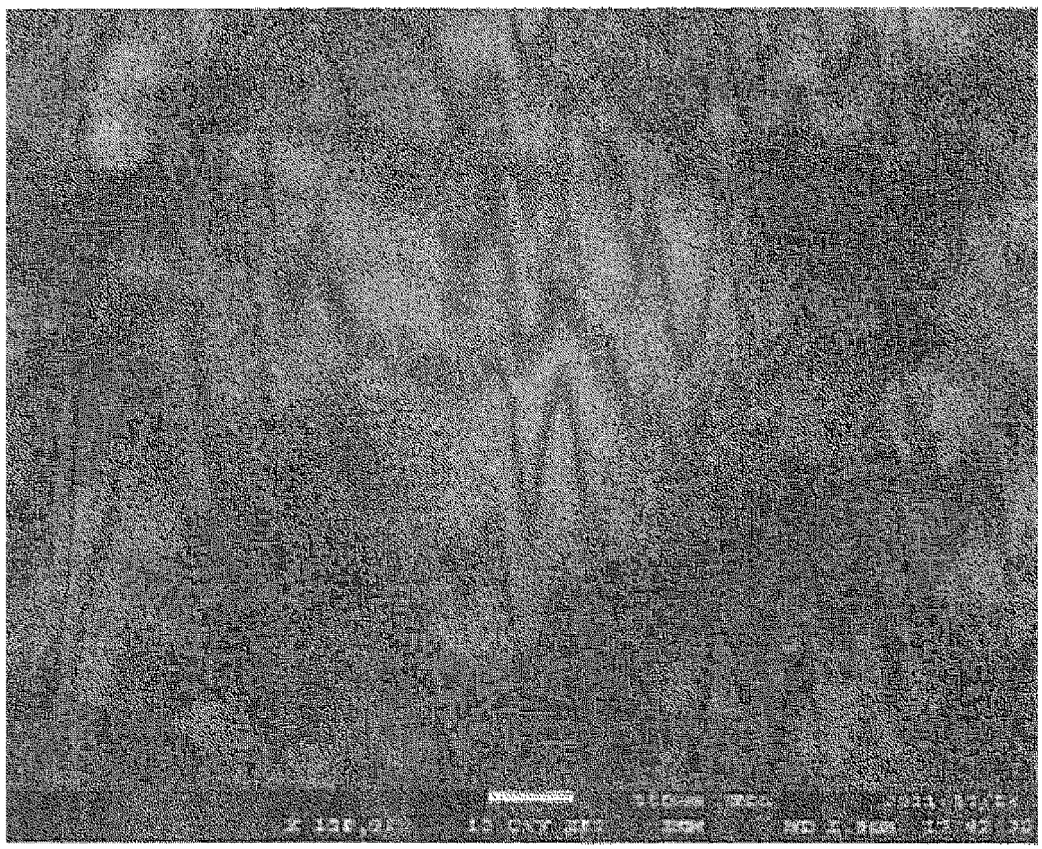
FIG. 18 is a SEM photograph of a surface of ITO film-formed by sputtering.
Figure 19:
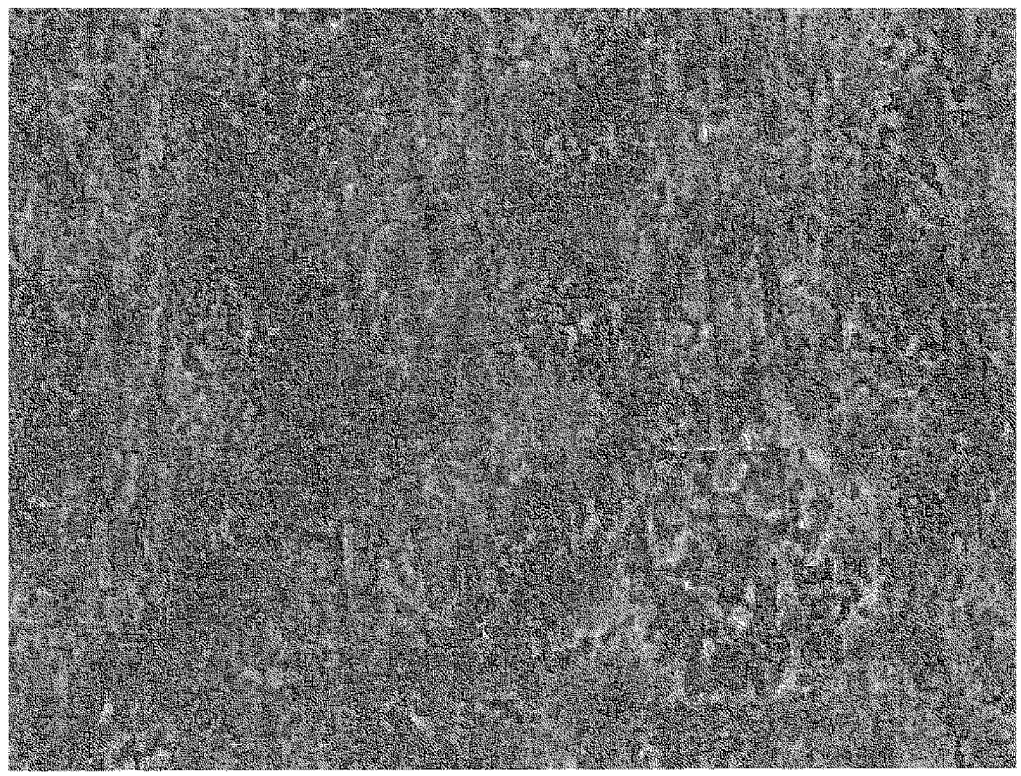
FIG. 19 is a SEM photograph of a surface of ITO film-formed by a sol gel process.

FIG. 18 is a SEM photograph of a surface of ITO film-formed by sputtering, and FIG. 19 is a SEM photograph of the surface of ITO film-formed by the sol gel process. In either of the cases, ITO was film-formed on a quartz substrate. The ITO film obtained by sputtering had a film thickness of approximately 100 nm, meanwhile the ITO film obtained by the sol gel process had a film thickness of approximately 40 nm. It was found that the ITO film obtained by the sol gel process had many defects and the film quality thereof was not so good.

Figure 20:
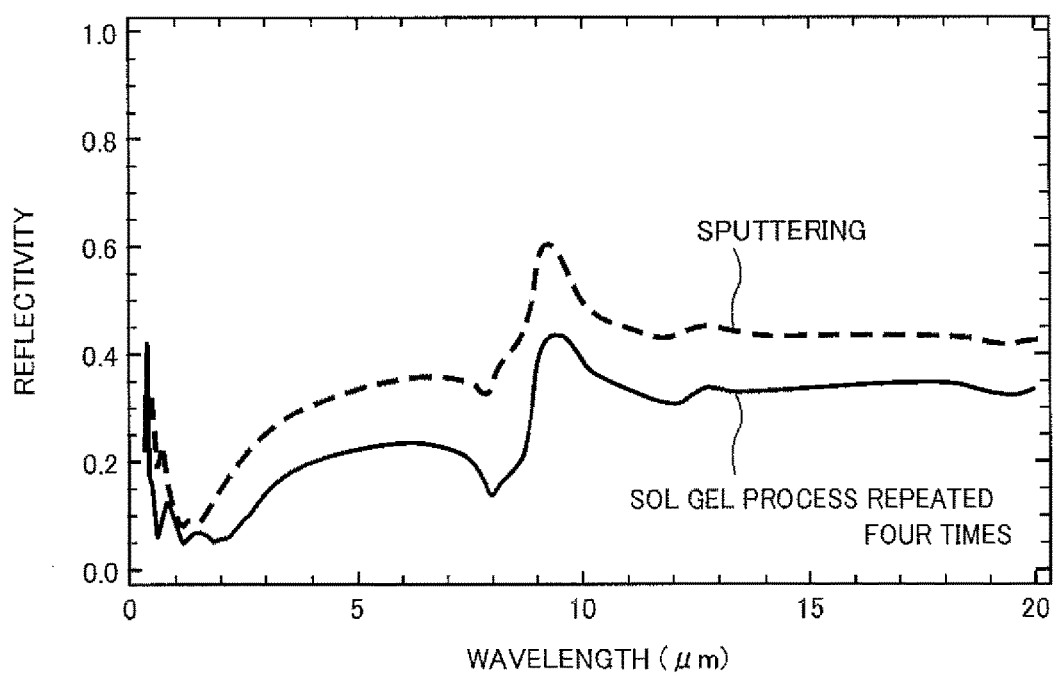
FIG. 20 illustrates a graph showing the reflectivity of an ITO film formed by sputtering and the reflectivity of an ITO film formed by a sol gel process.

FIG. 20 illustrates a graph showing the reflectivity of the ITO film formed by sputtering and the reflectivity of the ITO film formed by the sol gel process. Each of the ITO films were formed on quartz substrates by sputtering and the sol gel process, respectively. The ITO film formed by the sol gel process was obtained in such a manner that the sol gel process was repeated four times so that the ITO film by the sol gel process had the same level of film thickness (approximately 100 nm) as that formed by sputtering.

The peak around 10 μm in the graph shown in FIG. 20 indicates a larger transmitted light due to a thin film thickness and the resulting reflection of quartz serving as a substrate. The ITO film obtained by the sol gel process had a slightly lower reflectivity than the ITO film obtained by sputtering, but, achieved the almost same profile as the ITO film by sputtering, and hence, it can be considered that the ITO film by the sol gel process had the optically almost same film quality as the ITO film by sputtering. Furthermore, the ITO film obtained by the sol gel process had a one-digit lower specific resistance than the ITO film obtained by sputtering, and hence the ITO film by the sol gel process clearly had a poorer quality, but, it is understood that film quality had no optical effect.

It was understood that such use of the sol gel process enables an ITO film having a large area to be inexpensively formed, whereby a heat-absorbing material having a large area can be produced. It should be noted that, not only an ITO film, but also ZnO can be film-formed by the sol gel process.

<Second Embodiment>
<2-1. Heat-Absorbing Material>

In the above-mentioned first embodiment, as an inorganic film allowing visible light to be transmitted therethrough and reflecting near-infrared and mid-infrared rays having a wavelength longer than at least 2.3 um, a transparent conductive film, such as an ITO film, is formed on a heat-resistant metal, and furthermore, cavities are formed at an interface between the heat-resistant metal and the transparent conductive film, whereby the absorption characteristics are improved.

The cavities on the surface of the heat-resistant metal have advantages, such as a high effect of increasing light absorption in the surface of the metal, little dependence on material of the metal, and a little dependence on the incidence angle of light to be absorbed, but, if the cavities do not have a certain level of depth, the cavities cannot exert the effects.

Figure 21:
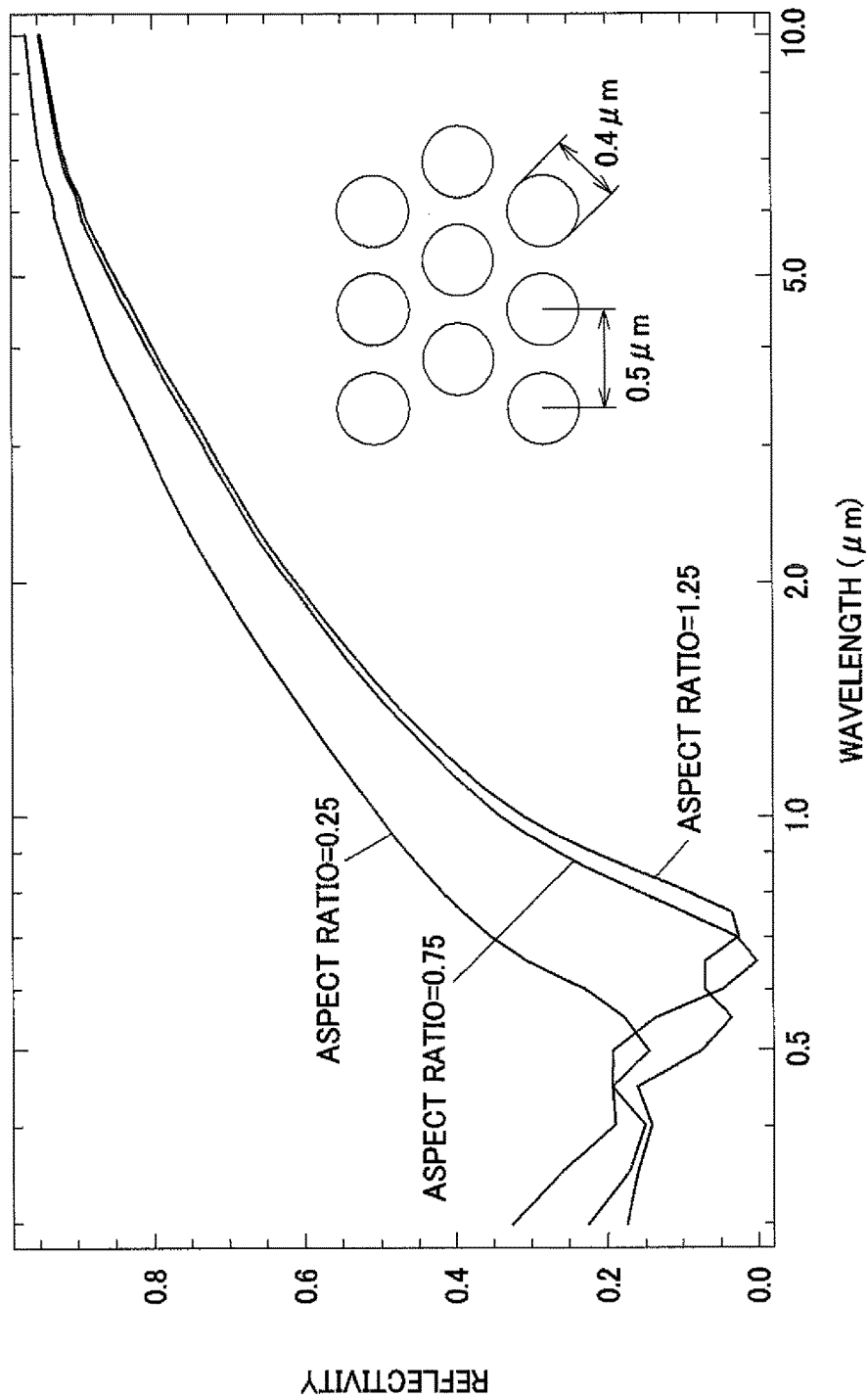
FIG. 21 illustrates a graph showing calculation results of the reflectivity with respect to the aspect ratio of a cavity.

FIG. 21 illustrates a graph showing calculation results of the reflectivity with respect to an aspect ratio of the cavities.

The cavities were arranged at a pitch of 0.5 μm and had a diameter of 0.4 μm, and Fe was used as the metal of the cavities. And, there was calculated each of the reflectivity when aspect ratios (d/a) of depth to diameter of the cavities illustrated in FIG. 4 were 0.25 (d=0.1 μm), 0.75 (d=0.3 μm), and 1.25 (d=0.5 μm).

As shown in FIG. 21, an aspect ratio of note less than 0.75 allows the reflectivity in the visible light region to be made sufficiently low. However, in order to achieve an aspect ratio of approximately 1.0, an advanced technique is needed in the production process. Particularly, wet etching, which can be performed at low cost, is isotropic etching, and therefore it is difficult to produce a cavity having an aspect ratio of more than 1.0.

The inventors found that the fog illation of a cermet, which is a mixture of a metal and a ceramic, on the cavities enables the reflectivity to be made sufficiently low even with a low aspect ratio.

Figure 22:
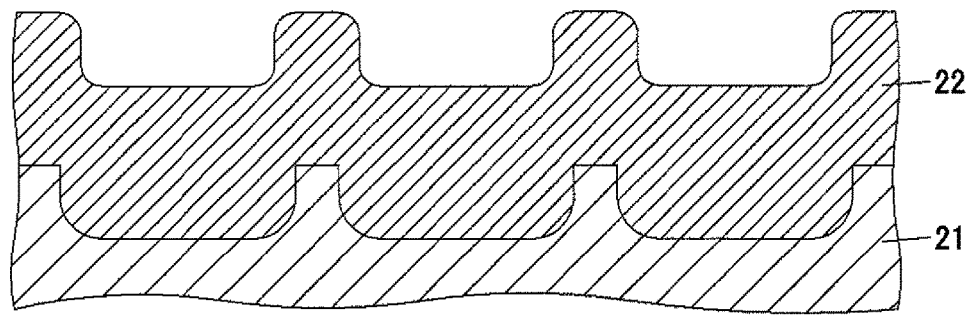
FIG. 22 is a cross-sectional view illustrating a heat-absorbing material according to a second embodiment.

In other words, as illustrated in FIG. 22, the heat-absorbing material according to the second embodiment comprises: a heat-resistant metal 21 having the substantially same periodic structure in a light incidence plane as the wavelength of sunlight having a specific wavelength in the wavelength regions of visible light and near-infrared rays; and a cermet 22 formed on the light incidence plane of the heat-resistant metal.

As is the case with the first embodiment, the heat-resistant metal 21 comprises preferably a high melting point metal, specifically, any of tantalum Ta, tungsten W, molybdenum Mo, niobium Nb, titanium Ti, iron Fe, and an alloy containing these as a main component. Furthermore, as the heat-resistant metal 21, stainless steel is preferably used. Stainless steel is inexpensive and stainless steel having a large area is easily available, and also stainless steel has advantages, such as relatively high heat resistance and easiness of machining.

The cavities in the light incidence plane of the heat-resistant metal 21 has a predetermined depth and the substantially same opening diameter as the wavelength of sunlight having a specific wavelength in the wavelength regions of visible light and near-infrared rays. The specific size of the cavity is not less than 200 nm and not more than 800 nm in diameter, preferably not less than 200 nm and not more than 500 nm in diameter, and preferably not less than 100 nm in depth. Furthermore, the fine-rugged surface pattern preferably has a honeycomb structure in which the cavities are arranged in a honeycomb shape. Furthermore, it is beneficial that the cavities are arranged at a pitch of not more than 1 μm.

The cermet 22 is a mixture of a ceramic and a metal. As the ceramic, oxide, such as $Al_2O_3$ or $SiO_2$, is preferably used, meanwhile, as the metal, a heat-resistant metal, such as tantalum Ta, tungsten W, molybdenum Mo, niobium Nb, titanium Ti, iron Fe, or an alloy containing these as a main component, is preferably used. The metal concentration in the cermet is preferably not more than 10 wt %, and, even with a metal concentration of approximately 2 wt %, sufficient effects can be obtained. A higher metal concentration in the cermet causes the reflectivity to be higher.

The cermet 22 preferably has a film thickness of not less than 100 nm and not more than 2000 nm. When the cermet 22 has a film thickness of less than 100 nm, the effect of reducing the reflectivity in the visible light region cannot be obtained, meanwhile, when the cermet 22 has a film thickness of more than 2000 nm, the reflectivity in the infrared region is reduced, and thus desirable characteristics cannot be achieved.

The cermet 22 is commonly used as a trough type solar-heat absorbing material or the like. For example, "Design and global optimization of high-efficiency solar thermal systems with tungsten cermets" (OPTICS EXPRESS, Vol. 19, No. S3, p 245) describes the use of a cermet of $SiO_2$ and W (tungsten), and furthermore, "Optical property and thermal stability of. Mo Mo—SiO(2) SiO(2) solar-selective coating prepared by magnetron sputtering" (Phys. Status Solidi A 208, No. 3, p 664) describes the use of a cermet of $SiO_2$ and Mo (molybdenum). However, in the above-mentioned arts, the cermet is formed on a plane, thereby causing a high dependence on incidence angle. Furthermore, besides the physical properties of the material, the mechanical structure of the film needs to be adjusted to control the absorption and radiation characteristics, thereby causing a problem, such as a decrease in heat resistance.

In the second embodiment, the simultaneous use of the cermet and the cavities on the surface of the heat-resistant metal enables the achievement of desirable absorption and radiation characteristics being such that absorption is performed in the visible light region meanwhile reflection is performed in the infrared region. Furthermore, since the cermet does not need complicated film-formation control, a high heat resistance can be maintained.

Figure 23:
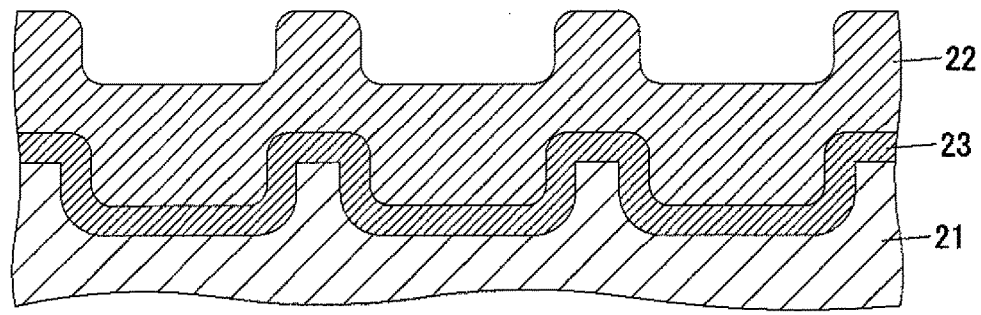
FIG. 23 is a cross-sectional view illustrating another heat-absorbing material.

Furthermore, as illustrated in FIG. 23, a metal film 23 may be formed between the heat-resistant metal 21 and the cermet 22. For example, in the case where stainless steel, a large area of which is inexpensively available, is used as the heat-resistant metal 21, the formation of the metal film 22 absorbing visible light more than stainless steel does allows the cermet 22 to have a thinner film thickness, without an increase in the reflectivity of visible light.

As is the case with the heat-resistant metal 21, the metal film 23 comprises preferably made of a high melting point metal, specifically, any of tantalum Ta, tungsten W, molybdenum Mo, niobium Nb, titanium Ti, iron Fe, and an alloy containing these as a main component.

The metal film 23 preferably has a film thickness of not less than 20 nm and not more than 500 nm. The metal film 23 having a film thickness of less than 20 nm prevents the effect of reducing the reflectivity in the visible light region from being achieved. On the other hand, the metal film 23 having a film thickness of more than 500 nm causes the total film thickness of the metal film 23 and the cermet 22 to be larger.

Furthermore, in the heat-absorbing materials illustrated in FIG. 22 and FIG. 23, a transparent conductive film may be additionally formed on the cermet 22. As the transparent conductive film, a zinc oxide-based transparent conductive film, an indium oxide-based transparent conductive film, a tin oxide-based transparent conductive film, and the like may be used. As explained in the first embodiment, the transparent conductive film allows visible light to be transmitted therethrough and reflects near-infrared rays and mid-infrared rays, and therefore, the formation of the transparent conductive film on the cermet 22 can achieve excellent absorption and radiation characteristics.

Figure 24:
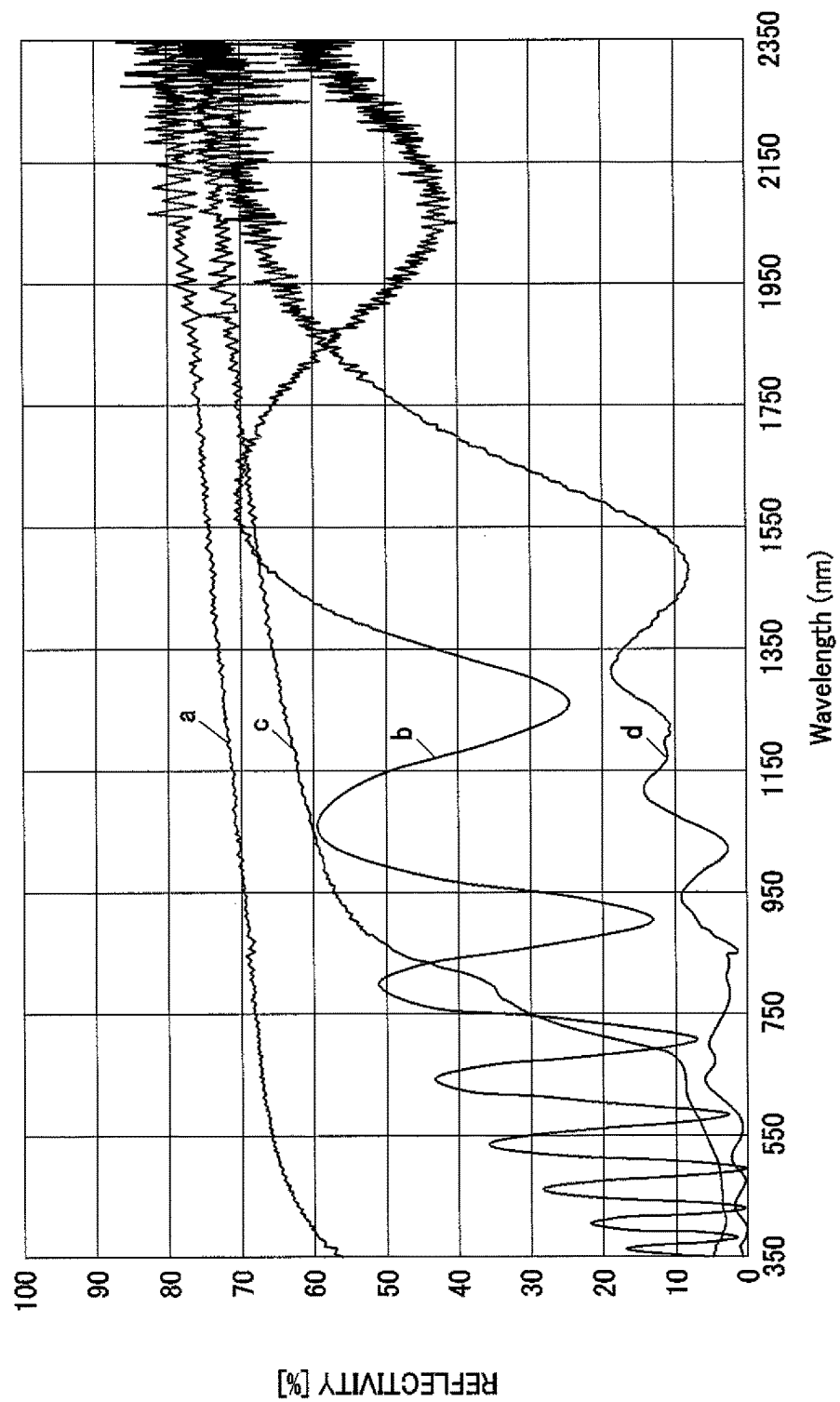
FIG. 24 illustrates a graph showing the reflectivities of a heat-absorbing material made up of a plate, a heat-absorbing material in which a cermet is film-formed on a plate, a heat-absorbing material in which cavities are formed, and a heat-absorbing material in which a cermet is film-formed on cavities.

FIG. 24 illustrates a graph showing the reflectivities of a heat-absorbing material made up of a plate, a heat-absorbing material in which a cermet is film-formed on a plate, a heat-absorbing material in which cavities are formed, and a heat-absorbing material in which a cermet is film-formed on cavities. Stainless steel (SUS304) was used for the plate and the cavities, and a mixed material of $Al_2O_3$ and Mo was used for the cermet. The cavities were arranged at a pitch of 0.7 µm and had a diameter of 0.6 µm and an aspect ratio (d/a) of depth to diameter of 0.3 (d=0.2 µm).

A line a represents the reflectivity of a stainless steel plane, and indicates that the reflectivity is kept high over the visible light region. A line b indicates the reflectivity of a heat-absorbing material obtained by film-forming a cermet having a film thickness of approximately 1500 nm on the surface of a stainless steel plane. Compared to the reflectivity of the stainless steel plane indicated by the line a, the reflectivity indicated by the line b decreases in the visible light region, but, a sinusoidal vibration resulting from a multiple echo in the film appears, and thus, depending on the wavelength, a portion in which the reflectivity is low and a portion in which the reflectivity is not so low alternately appear.

A line c indicates the reflectivity of an heat-absorbing material obtained by forming cavities in a stainless steel plane. In this case, due to the effect of absorption by the cavities, the reflectivity decreases in a wavelength region of around 800 nm to the shorter wavelength. A line d indicates the reflectivity of a heat-absorbing material obtained by film-forming a cermet having a film thickness of approximately 1000 nm on stainless cavities, and the reflectivity is low around a wavelength of 550 nm, which is a wavelength of the strongest solar light energy. Furthermore, the reflectivity indicated by the line d is low also in the near-infrared region around a wavelength of 1 µm, although in which the reflectivity is high in the case of the structure simply having cavities only, and the reflectivity indicated by the line d increases in a wavelength region from around 1 µm to 2 µm. From the viewpoint of heat radiation, this is a desirable characteristic. Thus, it is understood that the use of the cavity structure and the cermet in combination allows the desirable characteristic to be obtained.

Figure 25:
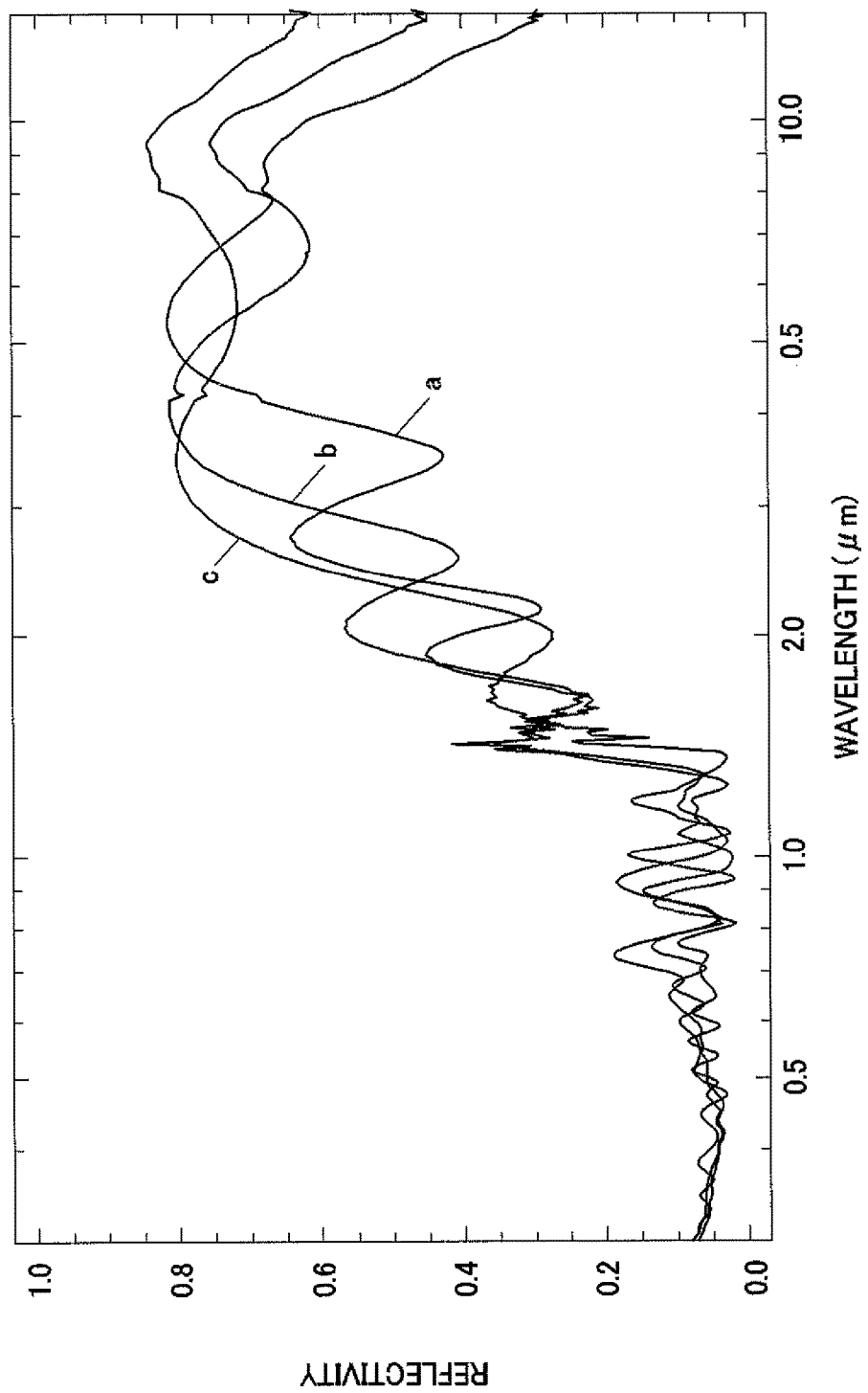
FIG. 25 illustrates a graph showing the reflectivity of a heat-absorbing material in which a metal film is formed between cavities and a cermet.

FIG. 25 illustrates a graph showing the reflectivity of a heat-absorbing material in which a metal film is formed between cavities and a cermet. Stainless steel (SUS304) was used for the cavities, and a mixed material of $Al_2O_3$ and Mo was used for the cermet. The cavities were arranged at a pitch of 0.7 µm and had a diameter of 0.6 µm and an aspect ratio (d/a) of depth to diameter of 0.3 (d=0.2 µm).

A line a indicates the reflectivity of a heat-absorbing material obtained by film-forming a cermet having a film thickness of approximately 1500 nm on a stainless steel cavity structure. It is understood that, although the line a somewhat winds, the reflectivity is high in the infrared region. Furthermore, a line b indicates the reflectivity of a heat-absorbing material obtained by film-forming Mo having a film thickness of 50 nm between stainless steel having cavities and a cermet having a film thickness of approximately 1150 nm; and a line c indicates the reflectivity of a heat-absorbing material obtained by film-forming W having a film thickness of 100 nm between stainless steel having cavities and a cermet having a film thickness of approximately 900 nm. The absorption of stainless steel serving as a base material is not so high in the visible light region. The sandwiching of a metal having a higher absorptivity in the visible light region than stainless steel allows a cermet to have a smaller thickness without an increase in the reflectivity in the visible light region.

Figure 26:
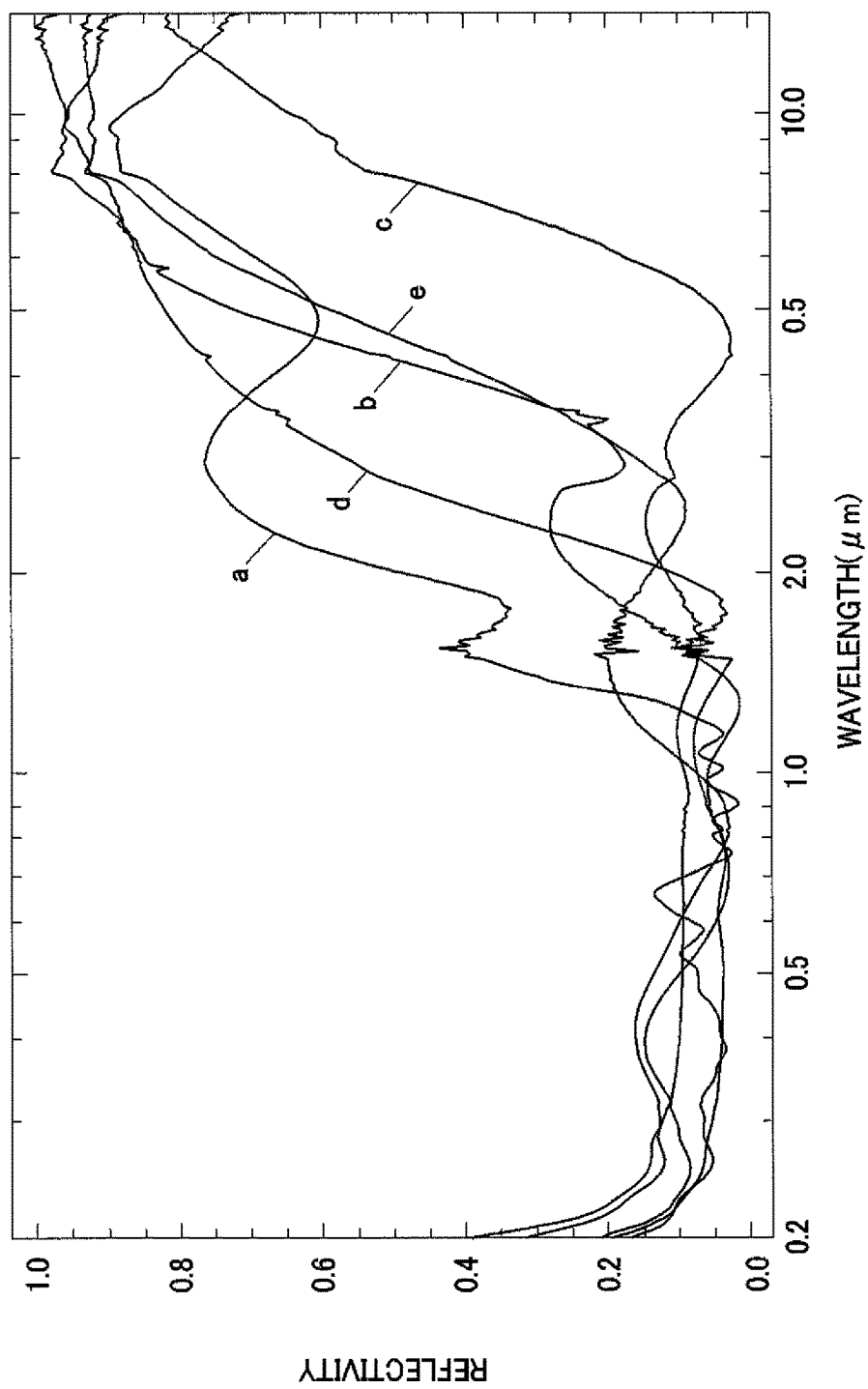
FIG. 26 illustrates a graph showing the reflectivity of a heat-absorbing material having a shape other than the shape of a cavity.
Figure 27:
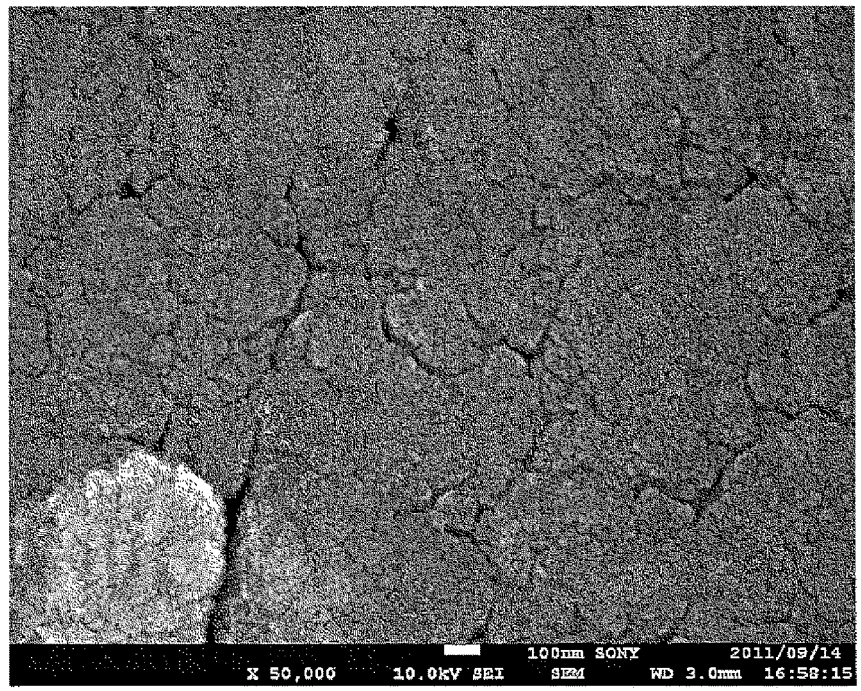
FIG. 27 is a SEM photograph of a surface of Comparative Example 1.
Figure 28:
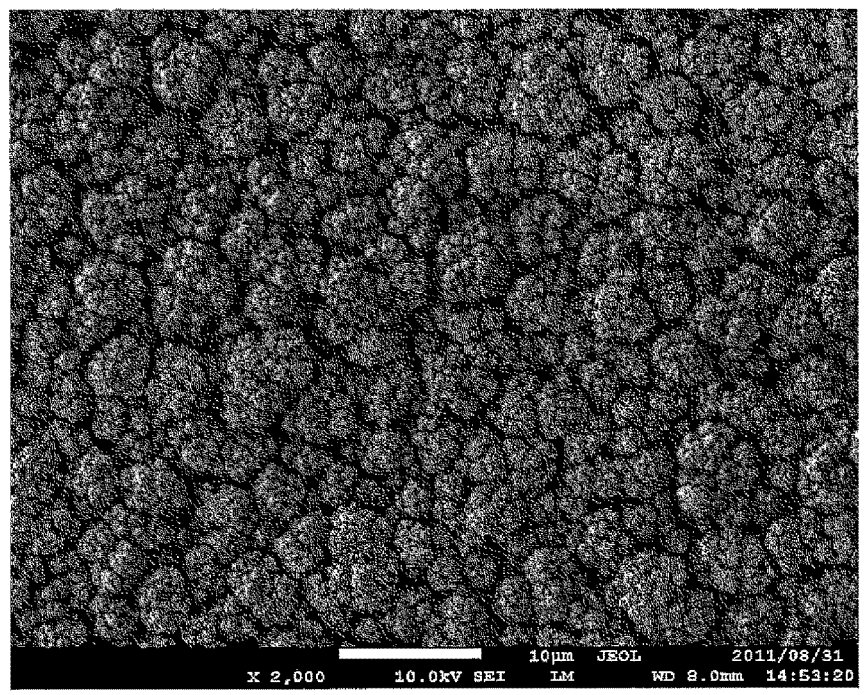
FIG. 28 is a SEM photograph of a surface of Comparative Example 2.

FIG. 26 illustrates a graph showing the reflectivity of heat-absorbing materials having a shape other than the shape of a cavity. A line a indicates the reflectivity of a heat-absorbing material as Example, the heat-absorbing material obtained by film-forming a cermet having a film thickness of approximately 1200 nm on stainless steel cavities. The cavities were arranged at a pitch of 0.7 µm and had a diameter of 0.6 µm and an aspect ratio (d/a) of depth to diameter of 0.3 (d=0.2 µm). A line b indicates the reflectivity of a heat-absorbing material as Comparative Example 1, the heat-absorbing material having a fractal-shaped surface. FIG. 27 is a SEM (Scanning Electron Microscope) photograph of the surface of Comparative Example 1. A line c indicates the reflectivity of a heat-absorbing material as Comparative Example 2, the heat-absorbing material having a fractal-shaped surface. FIG. 28 is a SEM photograph of the surface of Comparative Example 2. A line d indicates the reflectivity of a heat-absorbing material as Comparative Example 3, the heat-absorbing material having a planar multilayer film obtained by coating a surface of a copper plate with an absorption and heat-storage layer, an anti-reflection layer, and the like. A line e indicates the reflectivity of a heat-absorbing material as Comparative Example 4, the heat-absorbing material having a planar multilayer film obtained by coating a surface of an aluminum plate with an absorption and heat-storage layer, an anti-reflection layer, and the like.

Figure 29:
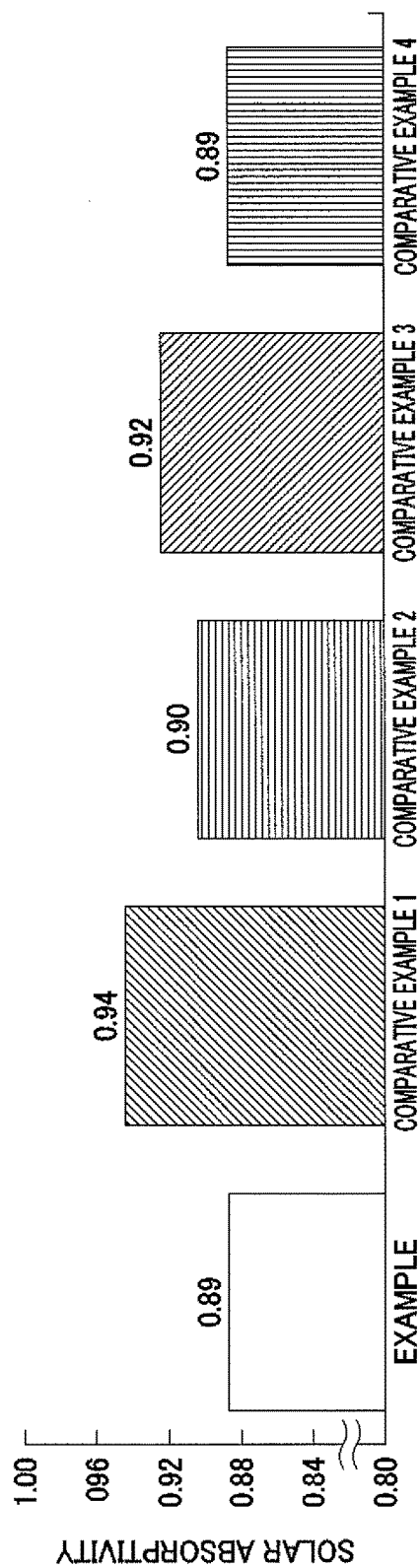
FIG. 29 illustrates a graph showing calculation results of the solar absorptivity of Example and Comparative Examples 1 to 4.
Figure 30:
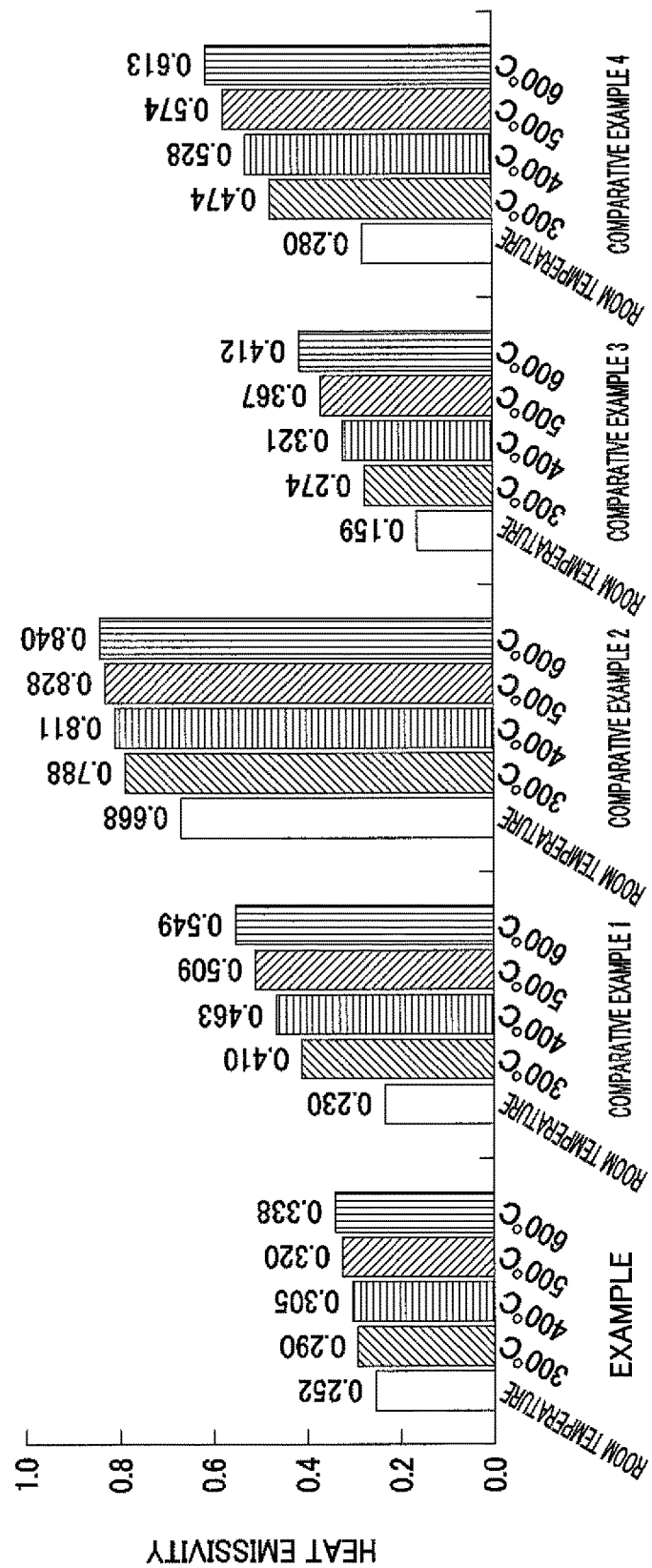
FIG. 30 illustrates a graph showing calculation results of the heat absorptivity of Example and Comparative Examples 1 to 4.

FIG. 29 and FIG. 30 illustrate graphs showing calculation results of the solar absorptivity and the heat absorptivity of Example and Comparative Examples 1 to 4, respectively. The solar absorptivity ($\alpha_s$) was calculated by the formula (1), and the heat absorptivity ($\epsilon_h$ (T)) was calculated by the formula (2).

Comparative Example 1 has the highest solar absorptivity, meanwhile the solar absorptivity in Example and other Comparative Examples are in the same level. Each of Example and Comparative Examples has a solar absorptivity of approximately 0.9, which suggests that each of them has a high sunlight absorptivity. Example has a relatively lower heat emissivity, and particularly, at high temperature, the difference in heat emissivity between Example and Comparative Examples 1 to 4 is larger. The reason for this is that the reflectivity of Example is high in the infrared region as is the case with the line a shown in FIG. 26, and also the reflectivity thereof is high at a wavelength of almost 2 μm and less, and therefore the radiation at high temperatures can be controlled.

On the other hand, as shown in Comparative Example 1 and Comparative Example 2, the fractal-shaped film generally allows the sunlight absorptivity to be higher, but, does not have high heat resistance because the detailed structure thereof is exposed to air.

Furthermore, Comparative Example 3 and Comparative Example 4 are multilayer films optimized at room temperature, but have no cavities formed therein, and therefore the heat radiation thereof is high at high temperatures.

<2-2. Process for Producing the Heat-Absorbing Material>

Next, a process for producing the heat-absorbing material according to the second embodiment will be explained. The process for producing the heat-absorbing material according to the second embodiment comprises the steps of: forming the substantially same periodic structure in a light incidence plane of a heat-resistant metal as the wavelength of sunlight having a specific wavelength in the wavelength regions of visible light and near-infrared rays; and film-forming a cermet on the light incidence plane of the heat-resistant metal. Any process may be used as a process for forming cavities having the periodic structure, but, interference exposure and wet etching are preferably used in combination. The combination of interference exposure and wet etching does not require a vacuum, and therefore has advantages in that an inexpensive apparatus can be used, cavities in a large area can be collectively formed, most kinds of materials can be applied, and the like.

Figure 31:
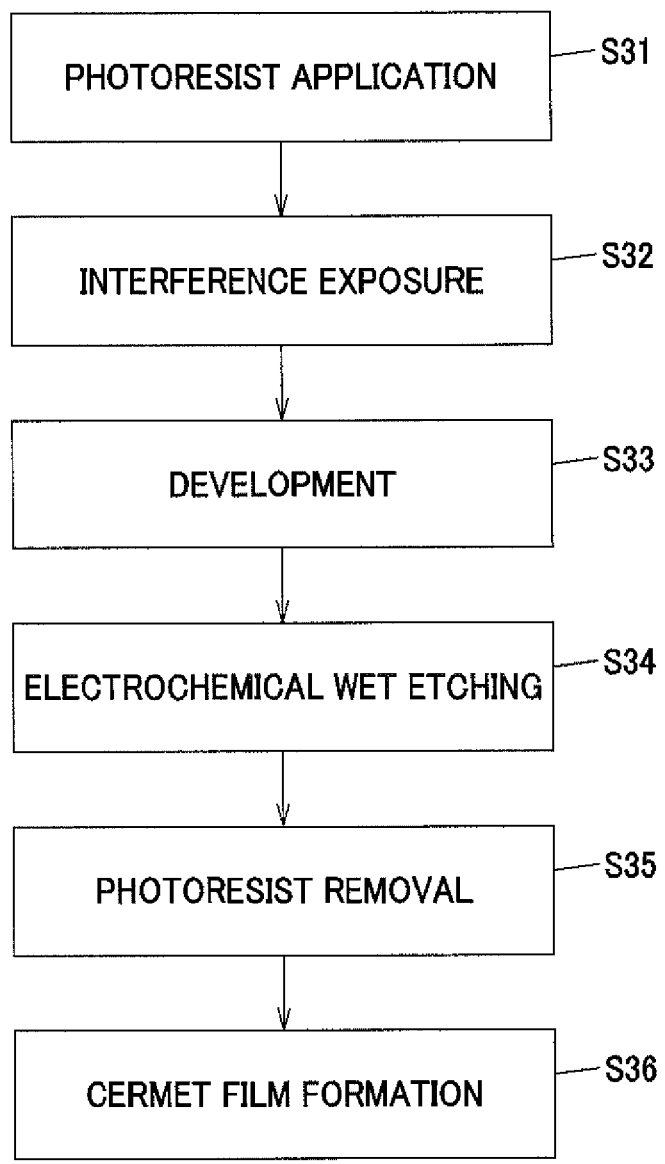
FIG. 31 is a flow chart showing a specific example of the process for producing a heat-absorbing material.

FIG. 31 is a flow chart showing a specific example of the process for producing the heat-absorbing material. This process for producing the heat-absorbing material comprises a photoresist application step S31, an interference exposure step S32, a development step S33, an electrochemical wet etching step S34, a photoresist removal step S35, and a cermet film formation step S36.

In the photoresist application step (S31), i-line photoresist was applied in the form of a thin film on a substrate. In the subsequent interference exposure step (S32), the i-line photoresist was subjected to three-beam interference exposure, using an interference exposure apparatus (light source for interference exposure: 355 nm (YAG, triple wave), CW oscillation). As described in "Three-beam interference lithography: upgrading a Lloyd's interferometer for single-exposure hexagonal patterning" (OPTICS LETTERS Vol. 34, No. 12, p 1783) and the like, three-beam exposure allows a high contrast exposure to be performed using interference fringes formed of three beams.

In the subsequent development step (S33), an unnecessary portion of the photoresist is removed by development. In the electrochemical wet etching step (S34), a photoresist substrate after the development is immersed into a 1% oxalic acid solution, for example, and voltage is applied between the substrate and an electrode.

In the subsequent photoresist removal step (S35), the photoresist left on the substrate after the electrochemical wet etching is removed. Thus, a pattern can be transferred on the substrate, whereby cavities can be formed.

Figure 32A:
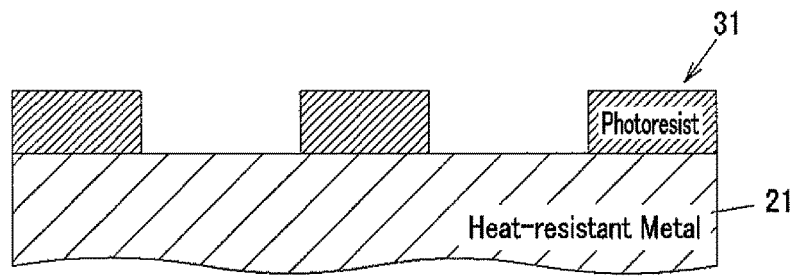
FIG. 32A to FIG. 32E schematically illustrate an etching step of protecting side walls.
Figure 32B:
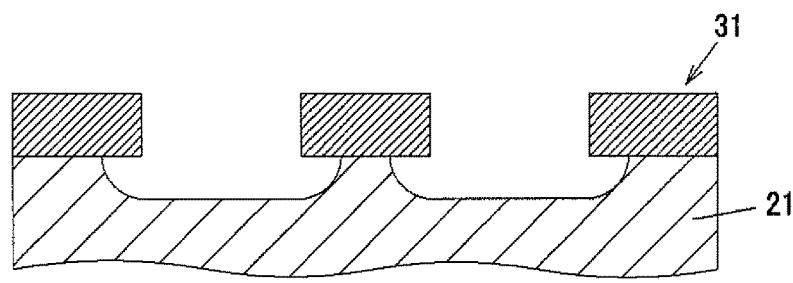
Figure 32C:
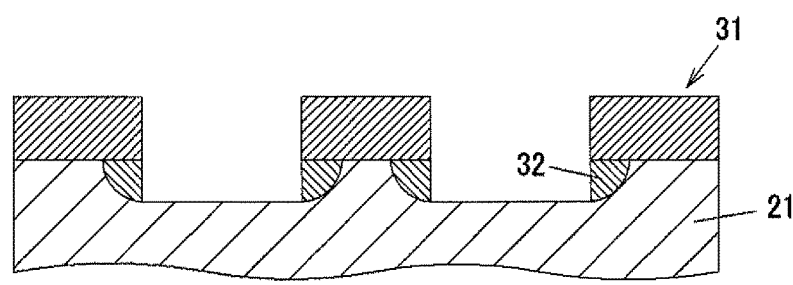

Furthermore, in the electrochemical wet etching step (S34) and the photoresist removal step (S35), with the side walls of the cavities being protected, etching may be repeated. FIG. 32 schematically illustrates an etching step of protecting the side walls. As illustrated in FIG. 32A and FIG. 32B, when a photoresist substrate 31 after the development is subjected to electrochemical wet etching, the photoresist substrate 31 is isotropically dissolved and eroded. Therefore, as illustrated in FIG. 32C, the side walls of the cavities are protected.

A process for protecting the side walls of the cavities is such that argon ions and oxygen ions are irradiated thereby to adhere residues to the side walls. Thus, a protective coat 32 for the side walls of the cavities is composed of a film to which the photoresist and oxide in the surface of the metal adhere.

Figure 32D:
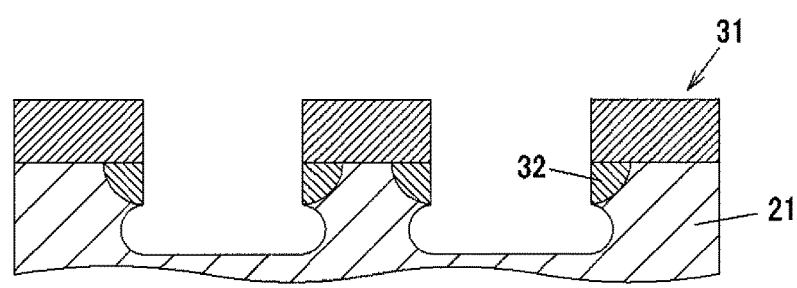
Figure 32E:

Performing electrochemical wet etching again after protecting the side walls of the cavities allows the dissolution of the side walls to be prevented and the dissolution in the depth direction to be performed, as illustrated in FIG. 32D. Then, as illustrated in FIG. 32E, the photoresist on the substrate and the protective coat 32 for the side walls of the cavities are removed. Thus, the etching together with the protection of the side walls of the cavities enables the aspect ratio to be increased.

In the subsequent cermet film formation step (S36), a cermet is film-formed on the cavities. For example, co-sputtering of an oxide, such as $Al_2O_3$ or $SiO_2$, and a metal having a high melting point, such as Mo or W, enables a cermet to be film-formed. This cermet is not a film having a complicated mechanical structure, but a film being relatively dense and uniform.

Figure 33:
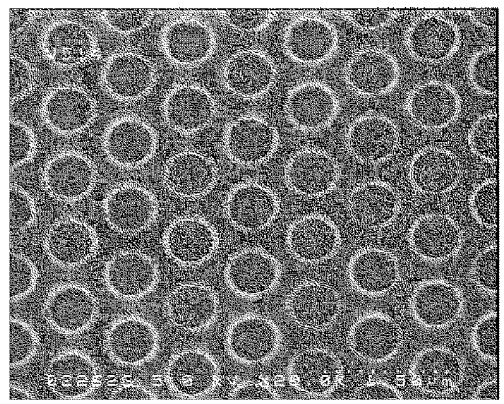
FIG. 33 is a SEM photograph of a surface after development.
Figure 34:
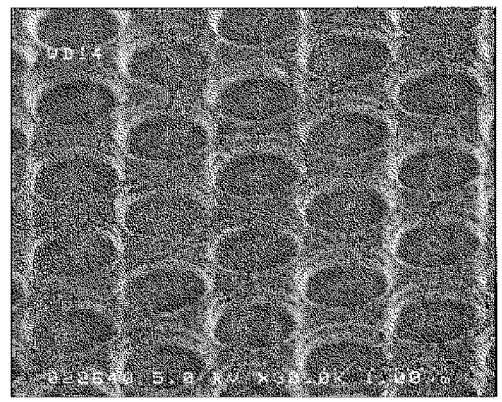
FIG. 34 is a SEM photograph of a surface after etching.
Figure 35:
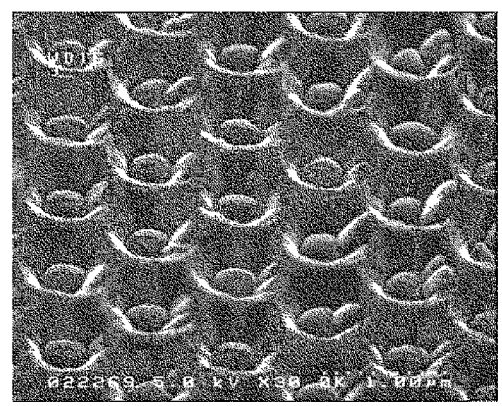
FIG. 35 is a SEM photograph of a surface after a cermet is film-formed.

FIG. 33, FIG. 34, and FIG. 35 are SEM photographs of surfaces after the development, after the etching, and after the film-formation of the cermet, respectively. Stainless steel (SUS304) was used as a substrate, and the film-formation of the cermet was performed in such a manner that a Mo chip was arranged on an Al$_2$O$_3$ target and co-sputtering was performed by vacuum processing.

In the form of the photoresist after exposure and development illustrated in FIG. 33, the distance between the cavities was 730 nm. It should be noted that the distance between the cavities is determined depending on an incidence angle at the time of the exposure, the incidence angle was approximately 9.4 degrees with respect to the direction of the normal to the substrate. Furthermore, the form of the stainless steel after etching illustrated in FIG. 34 has a depth of approximately 200 to 300 nm and an aspect ratio of approximately 0.4 to 0.5. Furthermore, it was found that the form after film-formation of the cermet illustrated in FIG. 35 was such that the cermet was not uniformly coated on the cavities and bowl-shaped, and the form of the cavities were maintained even when the cermet had a film thickness of 1000 to 1500 nm.

Figure 36:
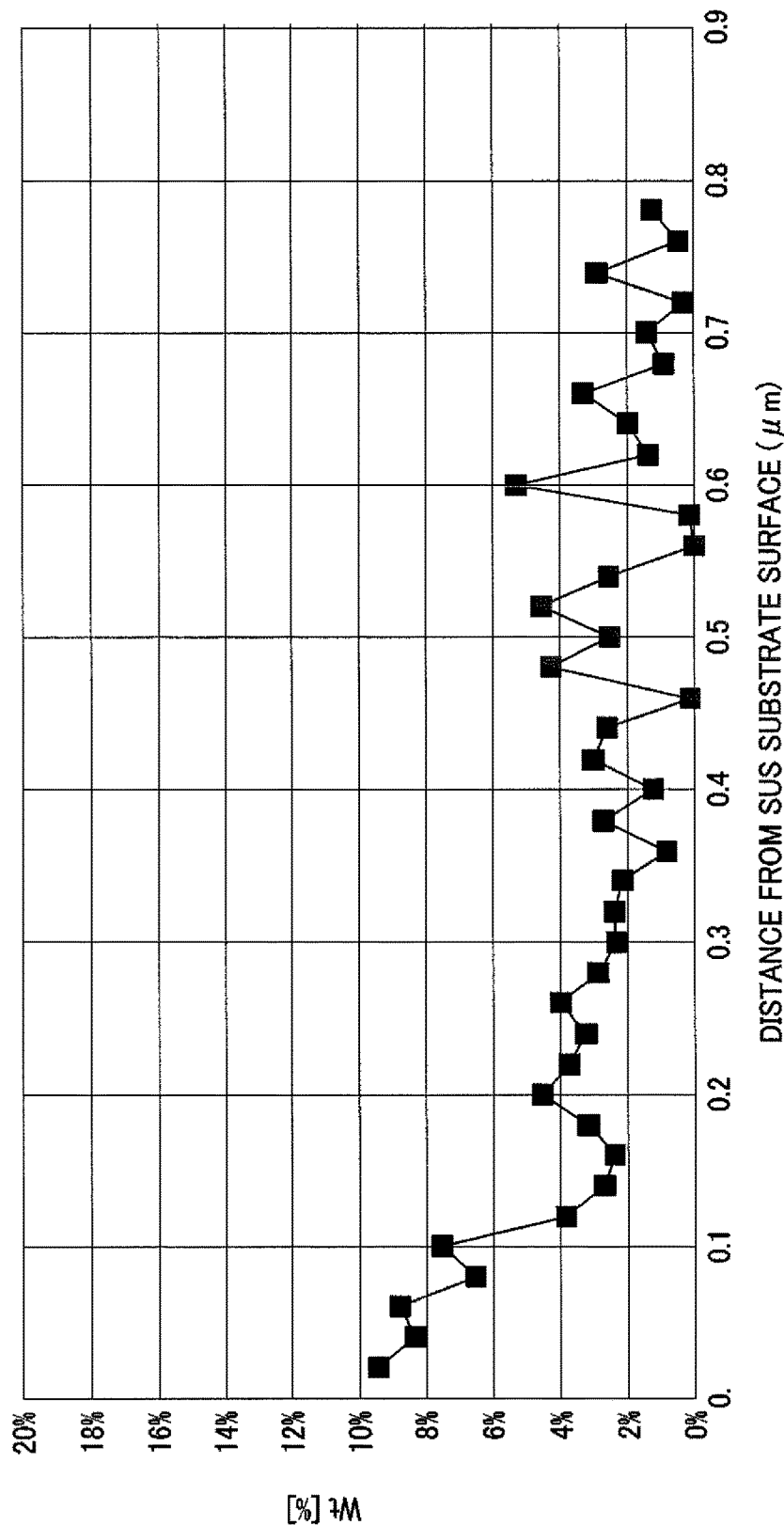
FIG. 36 illustrates a graph showing analysis results of element concentration in a cermet in the film thickness direction thereof.
Figure 37:
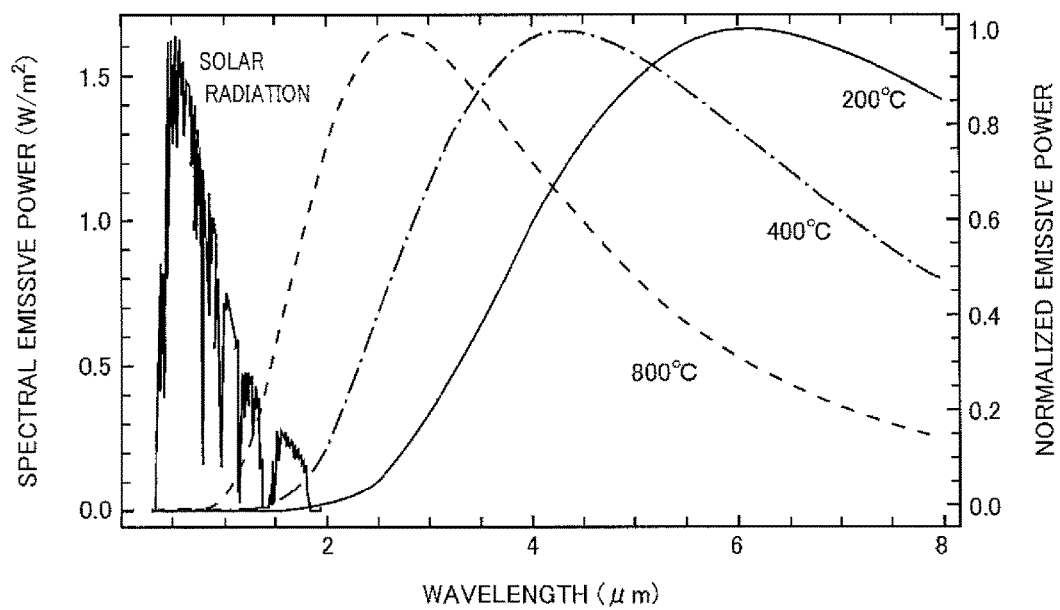
FIG. 37 illustrates a graph showing the wavelength distributions of solar radiation and heat radiation.

FIG. 36 illustrates a graph showing analysis results of element concentration in the cermet in the direction of film thickness thereof. In the figure, the horizontal axis represents a distance from the surface of the stainless steel, and the vertical axis represents the concentration (Weight %) of Mo in Al$_2$O$_3$. Stainless steel (SUS304) was used as a substrate, and the film-formation of the cermet was performed in such a manner that a Mo chip was arranged on an Al$_2$O$_3$ target and co-sputtering was performed by vacuum processing.

It was found that there was a gradient being such that the Mo concentration was higher, namely almost 10 wt %, at a portion closer to the surface of the stainless steel, but, the film thickness of more than 100 nm causes the Mo concentration of approximately 2 to 3 wt %. This concentration gradient consequently allows the absorptivity of the cavity structure to be increased.

REFERENCE SIGNS LIST

11 . . . heat-resistant metal,
12 . . . inorganic film,
21 . . . heat-resistant metal,
22 . . . cermet,
23 . . . metal film.

The invention claimed is:

1. Heat-absorbing material, comprising:
a heat-resistant metal having a substantially same periodic structure in a light incidence plane as a wavelength of sunlight having a specific wavelength in wavelength regions of visible light and near-infrared rays; and
a cermet having a metal concentration of not more than 10 wt % formed on the light incidence plane of the heat-resistant metal, wherein the cermet includes a metal containing at least one of Mo, W, and Ta; and a ceramic containing Al$_2$O$_3$ or SiO$_2$.

2. The heat-absorbing material according to claim 1, wherein the heat-resistant metal comprises at least one selected from the group consisting of tantalum, tungsten, molybdenum, niobium, titanium, iron, and an alloy thereof as a main component.

3. The heat-absorbing material according to claim 1, wherein cermet has a film thickness of not less than 100 nm and not more than 2000 nm.

4. The heat-absorbing material according to claim 1, wherein a metal film is formed between the heat-resistant metal and the cermet.

5. The heat-absorbing material according to claim 4, wherein the metal film contains at least one of Mo, W, and Ta.

6. The heat-absorbing material according to claim 4, wherein the metal film has a film thickness of not less than 20 nm and not more than 500 nm.

7. The heat-absorbing material according to claim 1, wherein a transparent conductive film is formed on the cermet.

8. The heat-absorbing material according to claim 7, wherein the transparent conductive film comprises any of a zinc oxide-based transparent conductive film, an indium oxide-based transparent conductive film, and a tin oxide-based transparent conductive film.

9. The heat-absorbing material according to claim 7, wherein the transparent conductive film has a film thickness of not less than 50 nm.

10. The heat-absorbing material according to claim 1, wherein the heat-resistant metal is stainless steel.

11. The heat-absorbing material according to claim 1, wherein the periodic structure of the heat-resistant metal has a pitch of not more than 1 μm and a hole diameter of 200 nm to 800 nm.

12. A process for producing a heat-absorbing material, comprising the steps of:
forming a substantially same periodic structure in a light incidence plane of a heat-resistant metal as a wavelength of sunlight having a specific wavelength in wavelength regions of visible light and near-infrared rays; and
film-forming a eel net having a metal concentration of not more than 10 wt % on the light incidence plane of the heat-resistant metal, wherein the cermet includes a metal containing at least one of Mo, W, and Ta; and a ceramic containing Al$_2$O$_3$ or SiO$_2$.

13. The process for producing a heat-absorbing material according to claim 12, wherein, in the step of forming the periodic structure, side walls of the periodic structure are protected, and etching is performed.

* * * * *

UNITED STATES PATENT AND TRADEMARK OFFICE
CERTIFICATE OF CORRECTION

PATENT NO. : 9,746,206 B2
APPLICATION NO. : 14/397923
DATED : August 29, 2017
INVENTOR(S) : Takatoshi Yamada et al.

Page 1 of 1

It is certified that error appears in the above-identified patent and that said Letters Patent is hereby corrected as shown below:

On the Title Page

Item (73), please change:
"Dexerials Corporation, Tokyo (JP)"
To:
--Dexerials Corporation, Tokyo (JP)
Tohoku University, Miyagi (JP)--.

Signed and Sealed this
Eleventh Day of December, 2018

Andrei Iancu
*Director of the United States Patent and Trademark Office*